United States Patent
Oda et al.

(10) Patent No.: US 9,828,492 B2
(45) Date of Patent: Nov. 28, 2017

(54) POLYAMIDE RESIN COMPOSITION, AND MOLDED ARTICLE

(71) Applicant: Mitsubishi Gas Chemical Company, Inc., Tokyo (JP)

(72) Inventors: Takafumi Oda, Kanagawa (JP); Tomonori Kato, Kanagawa (JP); Mayumi Kikuchi, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 14/785,711

(22) PCT Filed: Apr. 17, 2014

(86) PCT No.: PCT/JP2014/060970
§ 371 (c)(1),
(2) Date: Oct. 20, 2015

(87) PCT Pub. No.: WO2014/175169
PCT Pub. Date: Oct. 30, 2014

(65) Prior Publication Data
US 2016/0083564 A1     Mar. 24, 2016

(30) Foreign Application Priority Data

Apr. 23, 2013   (JP) .................................. 2013-090328
Sep. 4, 2013    (JP) .................................. 2013-183426

(51) Int. Cl.
| | | |
|---|---|---|
| C08L 77/00 | (2006.01) | |
| D21H 17/55 | (2006.01) | |
| C08G 69/26 | (2006.01) | |
| C08L 79/00 | (2006.01) | |
| B28B 11/08 | (2006.01) | |
| B29C 49/08 | (2006.01) | |
| B29C 55/00 | (2006.01) | |
| B29C 51/08 | (2006.01) | |
| B29C 57/00 | (2006.01) | |
| C08K 5/5435 | (2006.01) | |

(Continued)

(52) U.S. Cl.
CPC .......... C08K 5/5435 (2013.01); B29C 51/002 (2013.01); B29C 55/005 (2013.01); C08G 69/265 (2013.01); C08J 5/00 (2013.01); C08L 77/06 (2013.01); C08L 83/04 (2013.01); B29K 2077/00 (2013.01); B29K 2995/0067 (2013.01); C08J 2377/06 (2013.01)

(58) Field of Classification Search
None
See application file for complete search history.

(56) References Cited

U.S. PATENT DOCUMENTS

| 5,049,605 A | 9/1991 | Rekers |
|---|---|---|
| 6,541,087 B1 | 4/2003 | Pophusen et al. |

(Continued)

FOREIGN PATENT DOCUMENTS

| CN | 101056914 A | 10/2007 |
|---|---|---|
| CN | 101253000 A | 8/2008 |

(Continued)

OTHER PUBLICATIONS

International Search Report date of mailing Jul. 8, 2014 for PCT/JP2014/060970 and English translation of the same. (4 pages).
Usuki: Journal of "New Materials", Dec. 1996, p. 17.
Kristiansen, Werner, Tervoort, Smith, Blomenhofer and Schimidt; "The Binary System Isotactic Polypropulene/Bis (3,4-dimethylbenzyidene) sorbitol: Phase Behavior, Nucleation, and Optical Properties"; Macromolecules, vol. 36, No. 14 2003.
Extended European Search Report issued in corresponding European Application No. 14788262 on Oct. 26, 2016 (10 pages).

*Primary Examiner* — Robert T Butcher
(74) *Attorney, Agent, or Firm* — Fitch, Even, Tabin & Flannery LLP

(57) ABSTRACT

The invention provides a polyamide resin composition (1) containing a polyamide (A) and a free volume modifier (B), and having a free volume, as measured according to a positron annihilation method, of 0.0545 $nm^3$ or less. The invention also provides a polyamide resin composition (2) prepared by adding from 0.005 to 1.200 parts by mass of a polysilsesquioxane (B) whose main chain is comprised of siloxane bonds, to 100 parts by mass of a polyamide (A) that contains a diamine unit including an aromatic diamine unit represented by the following general formula (I) in an amount of 70 mol % or more and a dicarboxylic acid unit including at least one of a linear aliphatic dicarboxylic acid unit represented by the following general formula (II-1) and an aromatic dicarboxylic acid unit represented by the following general formula (II-2) in a total amount of 50 mol % or more:

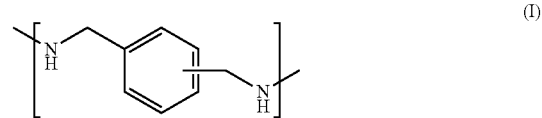

(I)

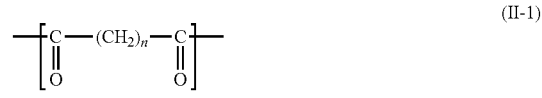

(II-1)

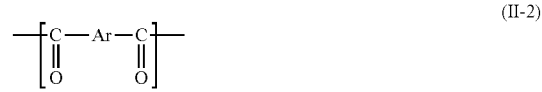

(II-2)

wherein n in the general formula (II-1) indicates an integer of from 2 to 18, and Ar in the general formula (II-2) represents an arylene group.

10 Claims, 1 Drawing Sheet

(51) Int. Cl.
*C08L 77/06* (2006.01)
*C08L 83/04* (2006.01)
*B29C 51/00* (2006.01)
*C08J 5/00* (2006.01)
*B29K 77/00* (2006.01)

(56) References Cited

U.S. PATENT DOCUMENTS

| | | |
|---|---|---|
| 2002/0052434 A1 | 5/2002 | Lichtenhan et al. |
| 2004/0062834 A1 | 4/2004 | Cruz |
| 2004/0062888 A1 | 4/2004 | Cruz |
| 2005/0202131 A1 | 9/2005 | Cruz |
| 2007/0129501 A1* | 6/2007 | Chen ............... B82Y 30/00 525/329.4 |
| 2008/0020218 A1 | 1/2008 | Nanba |
| 2012/0279575 A1 | 11/2012 | Tronc et al. |
| 2013/0001153 A1 | 1/2013 | Na et al. |
| 2013/0065005 A1 | 3/2013 | Yamamoto et al. |

FOREIGN PATENT DOCUMENTS

| | | |
|---|---|---|
| JP | 3-169882 A | 7/1991 |
| JP | 4-198329 A | 7/1992 |
| JP | 5-86295 A | 4/1993 |
| JP | 2000-248176 A | 9/2000 |
| JP | 2001-113650 A | 4/2001 |
| JP | 2003-251775 A | 9/2003 |
| JP | 2003-292795 A | 10/2003 |
| JP | 2003-533553 A | 11/2003 |
| JP | 2006-504439 A | 2/2006 |
| JP | 2008-523219 A | 7/2008 |
| JP | 2008-530312 A | 8/2008 |
| JP | 2009-509030 A | 3/2009 |
| JP | 2013-039964 A | 2/2013 |
| JP | 2014-111435 A | 6/2014 |
| WO | 2006/073662 A2 | 7/2006 |
| WO | 2006/086789 A2 | 8/2006 |
| WO | 2008/051190 A2 | 5/2008 |
| WO | 2011/145497 A1 | 11/2011 |

* cited by examiner

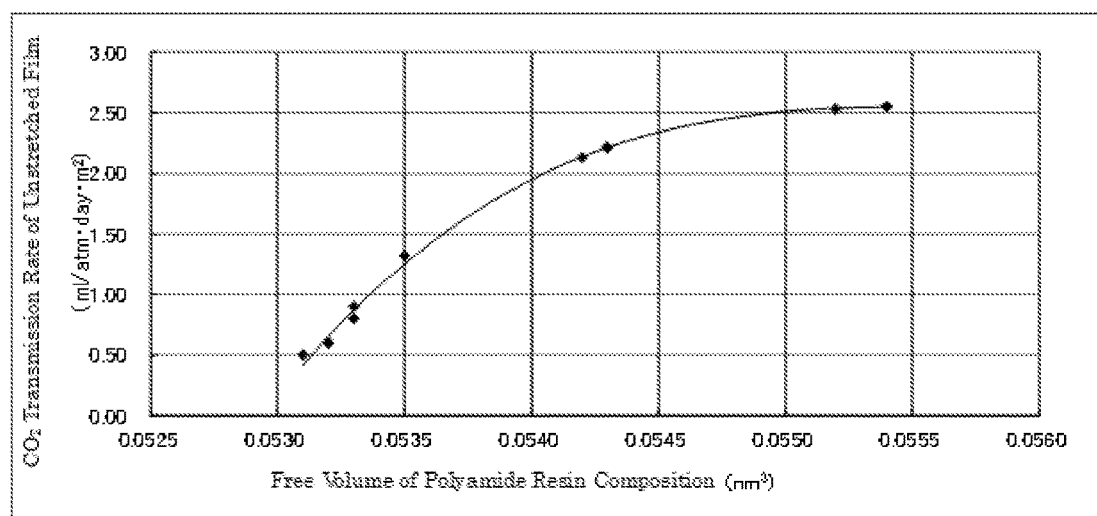

POLYAMIDE RESIN COMPOSITION, AND MOLDED ARTICLE

CROSS-REFERENCE TO RELATED APPLICATIONS

This application is a U.S. national phase application filed under 35 U.S.C. §371 of International Application PCT/JP2014/060970, filed on Apr. 17, 2014, designating the United States, which claims priority from Japanese Application Number 2013-090328, filed Apr. 23, 2013 and Japanese Application Number 2013-183426, filed Sep. 4, 2013, which are hereby incorporated herein by reference in their entirety.

TECHNICAL FIELD

The present invention relates to a polyamide resin composition and to a molded article formed by molding the resin composition.

BACKGROUND ART

As gas-barrier resins not containing chlorine, there are known polyamide resins such as nylon 6, polymetaxylyleneadipamide (hereinafter referred to "N-MXD6"), etc., and ethylene-vinyl copolymers.

Of those, N-MXD6 has good mechanical properties and is excellent in oxygen-barrier performance, especially in oxygen-barrier performance in high-humidity environments, and is therefore favorable as a food-wrapping/packaging material that is required to have oxygen-barrier performance after thermal sterilization treatment such as boiling or retort treatment.

As food-wrapping/packaging materials, used are multi-layer bottles, blend bottles and stretched films using a polyethylene terephthalate and a metaxylyleneadipamide. Also used are laminate films formed by laminating a base film of a polyolefin or the like and a resin film containing a polyethylene terephthalate and a metaxylyleneadipamide, and mixed resin films formed by further mixing a nylon 6 or the like and molding the resultant mixture.

As food-wrapping/packaging materials, plastic materials are being used these days in place of glass, and the plastic materials are being required to have further improved barrier performance against oxygen, carbon dioxide, water vapor, etc. Depending on the use thereof, food-wrapping/packaging materials may be required to be excellent in transparency and moldability.

On the other hand, heretofore, resin compositions and resin molded articles containing nylon 6, N-MXD6 or the like have been improved variously. For example, PTL 1 discloses a film and a sheet obtained from a polyamide resin composition in which N-MXD6 is mixed with any other specific polyamide having a high crystallization rate such as nylon 6 or the like. PTL 1 says that the film and the sheet are flexible and can keep excellent transparency even in high-humidity atmospheres.

However, the film and the sheet described in PTL 1 are molded from a resin composition containing any other polyamide mixed therein, and therefore have a problem in that the gas barrier performance thereof is poor, as compared with a film of N-MXD6 alone.

NPL 1 discloses a composite material in which a clay mineral having a molecular size is dispersed in nylon 6, and the nylon 6 and the clay mineral bond with ion-bonding, that is, a so-called "nylon 6-clay hybrid". NPL 1 says that, in the nylon 6-clay hybrid, the growth of the spherocrystals is retarded by the clay layer and the size of the spherocrystals is controlled to be not more than the wavelength of the visible light, and therefore the visible light transmittance of the hybrid is increased compared with that of ordinary polyamide.

N-MXD6, which is a crystalline polyamide as well, could be expected to have the same effect, but for expressing the effect, 1% of a clay mineral must be added thereto.

However, with respect to a film, a sheet and the like molded from a composite material that contains N-MXD6 and, as added thereto, at least 1% of a clay mineral, the mechanical properties such as impact resistance lower, and the color tone worsens.

In a case where a film formed of a composite material that is prepared by blending N-MXD6 with an inorganic substance such as talc, mica or the like is used for boiling treatment and retort treatment, the film can be expected to have whitening resistance after heating. However, in the composite material of the type, the crystallization rate is accelerated by 2 times or more as compared with that in additive-free N-MXD6, and therefore, in a case where the material is used as a molding material for stretched films or deep-drawn cups and the like to be formed of a sheet, the crystallization rate in the material is too high and therefore the films and the sheets could not be stretched owing to crystallization therein, and, as a result, there occur some problems in that the films and the sheets would be broken or would be stretched unevenly, that is, the moldability thereof is extremely poor.

PTL 2 discloses a film, a sheet and a hollow container formed of a polyamide resin composition that is prepared by adding, to a polyamide MXD 6, a specific amount of a diamide compound or a diester compound obtained from a specific fatty acid such as ethylenebis-stearylamide or the like and a specific diamine or a specific diol. The reference says that the film and the like whiten little and can therefore keep transparency during storage in a high-humidity atmosphere or on being kept in contact with water, especially with boiling water, in an amorphous and non-stretched state or even in an amorphous and low-stretched state. However, in PTL 2, nothing is investigated relating to the barrier performance against oxygen or the like of these sheets and others.

PTL 3 describes an organic nucleating agent for polypropylene that contains an alkyl-substituted aromatic aldehyde and a bis(dibenzylidene)sorbitol acetal to be obtained from the relevant acetal.

As shown in PTL 2, it is known that the organic nucleating agent for polypropylene dissolves in polypropylene and constitutes a nanometer-level network structure, and starting from the network as nuclei, polypropylene spherocrystals of nanometer-order grow. The spherocrystals have a nano-level crystal size, and are therefore excellent in transparency, and the nucleating agent is widely used for improving the transparency of polypropylene.

However, in a case where the bis(dibenzylidene)sorbitol acetal is added to a polyamide, there still occurs a problem that the barrier performance of the resultant mixture greatly worsens in high-humidity environments, though the additive exhibits an effect for improving the transparency of the composition of polycondensed resin such as a polyamide or the like and an effective for improving the barrier performance at a low humidity.

CITATION LIST

Patent Literature

PTL 1: JP-A 4-198329
PTL 2: JP-A 2000-248176
PTL 3: JP-A 3-169882

Non-Patent Literature

NPL 1: Journal of "New Materials", December 1996, page 17
NPL 2: Macromolecules, Vol. 36, No. 14, 2003

SUMMARY OF INVENTION

Specifically, a molded article formed by molding a resin composition containing nylon or M-MXD6 still has room for improvement of the gas-barrier performance thereof, and it is desired to improve the gas-barrier performance of the molded article, for example, against carbon dioxide, oxygen or the like. In addition, there is also still room to further improve the transparency and the moldability of the composition, and for example, it is desired to provide a polyamide resin composition having good transparency and moldability while having good gas-barrier performance.

The present invention has been made in consideration of the above-mentioned problems and the first problem of the present invention is to provide a polyamide resin composition capable of being a molding material for a molded article excellent in gas-barrier performance against carbon dioxide, oxygen or the like, especially in gas-barrier performance against carbon dioxide, and to provide a molded article formed by molding the resin composition.

The second problem of the present invention is to provide a polyamide resin composition capable of forming a molded article which is good in transparency and excellent in gas-barrier performance against oxygen, water vapor or the like (especially in gas-barrier performance in high-humidity environments), not lowering the moldability into stretched films, deep-drawn cups or the like, and to provide a molded article formed by molding the resin composition.

The present inventors have found that the first problem can be solved by controlling the free volume of a polyamide resin composition, as measured according to a positron annihilation method, to a predetermined value or less, and have completed the first aspect of the present invention described below.

In addition, the present inventors have found that a polyamide resin composition containing, as added to a polyamide containing a specific diamine unit and a specific dicarboxylic acid unit, a predetermined amount of a polysilsesquioxane whose main chain is comprised of siloxane bonds, can solve the second problem, and have completed the second aspect of the present invention.

Specifically, the first aspect of the present invention provides the following [1] to [11].

[1] A polyamide resin composition containing a polyamide (A) and a free volume modifier (B), and having a free volume, as measured according to a positron annihilation method, of 0.0545 nm$^3$ or less.
[2] The polyamide resin composition according to the above [1], wherein the polyamide (A) is a polyamide (A1) that contains a diamine unit including an aromatic diamine unit represented by the following general formula (I) in an amount of 70 mol % or more, and a dicarboxylic acid unit including at least one of a linear aliphatic dicarboxylic acid unit represented by the following general formula (II-1) and an aromatic dicarboxylic acid unit represented by the following general formula (II-2) in a total amount of 50 mol % or more.

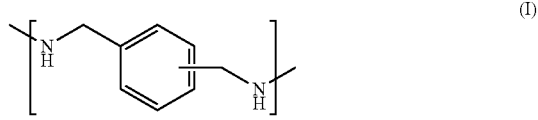

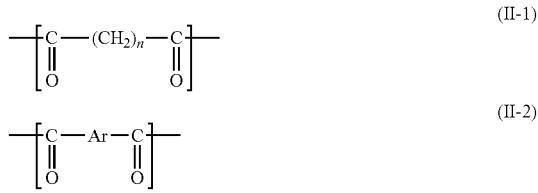

In the above general formula (II-1), n indicates an integer of from 2 to 18. In the above general formula (II-2), Ar represents an arylene group.
[3] The polyamide resin composition according to the above [1] or [2], wherein the free volume modifier (B) is a polysilsesquioxane (B1) whose main chain is comprised of siloxane bonds.
[4] The polyamide resin composition according to the above [3], wherein the polysilsesquioxane (B1) is a compound represented by the following general formula (b).

In the above general formula (b), n indicates an integer represented by (2m+4) (where m indicates an integer of 1 or more), R independently represents a hydrogen atom, a halogen atom, a hydroxyl group, an amino group, an imide group, an alkenyl group, an alkynyl group, a cyano group, a nitro group, an alkyl group having from 1 to 10 carbon atoms, a cycloalkyl group having from 3 to 12 carbon atoms, an aryl group having from 6 to 18 carbon atoms, an arylalkyl group having from 6 to 24 carbon atoms, a polyalkyleneoxy group having from 2 to 10 carbon atoms, an alkylcarbonyl group having an alkyl group with from 1 to 10 carbon atoms, an alkyl (meth)acrylate having an alkyl group with from 1 to 10 carbon atoms, an alkoxy group having from 1 to 10 carbon atoms, an aryloxy group having from 6 to 18 carbon atoms, or a siloxane, and the hydrogen atom in these groups may be substituted.
[5] The polyamide resin composition according to the above [3] or [4], wherein the content of the polysilsesquioxane (B1) is 0.005 parts by mass or more relative to 100 parts by mass of the polyamide (A).
[6] The polyamide resin composition according to any of the above [3] to [5], wherein the polysilsesquioxane (B1) is a compound having a cage structure.
[7] The polyamide resin composition according to the above [6], wherein the polysilsesquioxane (B1) is a polysilsesquioxane compound having a cage structure in which one or more bonds to form the cage structure are cleaved to provide a silicon atom and/or an oxygen atom which further have a substituent.
[8] The polyamide resin composition according to the above [6], wherein the polysilsesquioxane (B1) is a polysilsesquioxane compound having a cage structure in which one or more of silicon atoms and oxygen atoms to form the cage structure are lost to provide a silicon atom and/or an oxygen atom which further have a substituent.

[9] The polyamide resin composition according to any of the above [1] to [8], wherein the free volume, as measured according to a positron annihilation method, of the polyamide resin composition is 0.0535 nm$^3$ or less.
[10] A molded article formed by molding the polyamide resin composition of any of the above [1] to [9].
[11] A secondary molded article formed by further stretching and/or thermoforming the molded article of the above [10].

The second aspect of the present invention provides the following [12] to [17].
[12] A polyamide resin composition prepared by adding from 0.005 to 1.200 parts by mass of a polysilsesquioxane (B1) whose main chain is comprised of siloxane bonds, to 100 parts by mass of a polyamide (A2) that contains a diamine unit including an aromatic diamine unit represented by the following general formula (I) in an amount of 70 mol % or more and a dicarboxylic acid unit including at least one of a linear aliphatic dicarboxylic acid unit represented by the following general formula (II-1) and an aromatic dicarboxylic acid unit represented by the following general formula (II-2) in a total amount of 50 mol % or more.

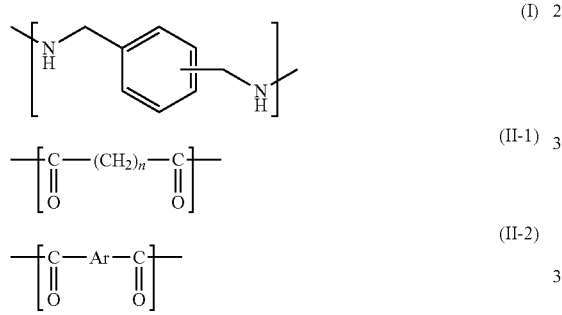

In the above general formula (II-1), n indicates an integer of from 2 to 18. In the above general formula (II-2), Ar represents an arylene group.
[13] The polyamide resin composition according to the above [12], wherein the polysilsesquioxane (B1) is a compound having a steric structure of a cage structure or a ladder structure.
[14] The polyamide resin composition according to the above [12] or [13], wherein the polysilsesquioxane (B1) is a compound represented by the following general formula (b).

(RSiO$_{1.5}$)$_n$      (b)

In the above general formula (b), n indicates an integer represented by (2m+4) (where m indicates an integer of 1 or more), R independently represents a hydrogen atom, a halogen atom, a hydroxyl group, an amino group, an imide group, an alkenyl group, an alkynyl group, a cyano group, a nitro group, an alkyl group having from 1 to 10 carbon atoms, a cycloalkyl group having from 3 to 12 carbon atoms, an aryl group having from 6 to 18 carbon atoms, an arylalkyl group having from 6 to 24 carbon atoms, a polyalkyleneoxy group having from 2 to 10 carbon atoms, an alkylcarbonyl group having an alkyl group with from 1 to 10 carbon atoms, an alkyl (meth)acrylate having an alkyl group with from 1 to 10 carbon atoms, an alkoxy group having from 1 to 10 carbon atoms, an aryloxy group having from 6 to 18 carbon atoms, or a siloxane, and the hydrogen atom in these groups may be substituted.

[15] The polyamide resin composition according to any of the above [12] to [14], further containing any other resin than the polyamide (A2).
[16] A molded article formed by molding the polyamide resin composition of any of the above [12] to [15].
[17] A secondary molded article formed by further stretching and/or thermoforming the molded article of the above [16].

The polyamide resin composition of the first aspect of the present invention mentioned above can be a molding material for molded articles excellent in gas-barrier performance against carbon dioxide, oxygen and the like, especially excellent in gas-barrier performance against carbon dioxide.

The polyamide resin composition of the second aspect of the present invention can be a molding material for molded articles having good transparency and excellent in gas-barrier performance against oxygen, carbon dioxide, water vapor and the like (especially gas-barrier performance in high-humidity environments), not lowering the moldability thereof into stretched films, deep-drawn cups and the like.

BRIEF DESCRIPTION OF DRAWING

The FIGURE is a graph showing the relationship between the free volumes of the polyamide resin compositions prepared in Examples and Comparative Examples and the carbon dioxide transmission rates of the unstretched films formed of the resin compositions.

DESCRIPTION OF EMBODIMENTS

The present invention is described in more detail with reference to the embodiments thereof described below.

Hereinunder, first, the polyamide resin composition of the first aspect of the present invention is described as a polyamide resin composition (1).
[Polyamide Resin Composition (1)]

The polyamide resin composition (1) of the present invention contains a polyamide (A) and a free volume modifier (B), and has a free volume, as measured according to a positron annihilation method, of 0.0545 nm$^3$ or less.

As a method for determining the free volume of a polymer, there is known a positron annihilation method (see Polymers, Vol. 42, December (1993)).

In general, when a positron (e$^+$) enters a polymer, then the positron binds to an electron (e$^-$) therein to form a positronium (Ps).

The positron annihilation method is a method for determining the free volume of a polymer by measuring the lifetime ($\tau_3$) of ortho-positronium (o-Ps, having a radius of 0.1 nm or less, which may be referred to as "o-Ps") that accounts for ¾ of positronium (Ps), when the ortho-positronium has entered the pore in the polymer.

The lifetime ($\tau_3$) of o-Ps is determined by the probability that the positron (e$^+$) of o-Ps could overlap with the electron (e$^-$) in the wall of the pore when o-Ps collides with the wall of the pore existing in the polymer, and when the pore in the polymer is larger, then the lifetime ($\tau_3$) of o-Ps is longer.

The pore is considered to be a spherical well-type potential having a limitless height and the wall of the pore is considered to have an electron layer having a thickness of ΔR, and under the condition, the overlapping of the electron layer and the wave function of o-Ps is calculated to give the positron (e$^+$) annihilation rate. The model having the positron annihilation rate thus calculated well corresponds to the found data in actual experiments. Consequently, when the pore diameter R in the polymer is from 0.16 up to 0.8 nm or so, then the relationship between the lifetime ($\tau_3$) of o-Ps and the pore diameter R satisfies the following equation (1).

$$1/\tau_3 = 2\left[1 - \frac{R-\Delta R}{R} + \frac{1}{2\pi}\sin\left(\frac{2\pi(R-\Delta R)}{R}\right)\right]. \quad (1)$$

In the above equation (1), $\tau_3$ means the lifetime of the analyzed orthopositronium (o-Ps), R means the pore diameter in the polymer, and $\Delta R$ means the thickness of the wall of the pore.

Specifically, by determining the lifetime ($\tau_3$) of orthopositronium (o-Ps) according to the positron annihilation method, the pore diameter R in the polymer can be calculated according to the above equation (1). Further, since pore volume (free volume)=$4/3\pi R^3$, the free volume of the polymer can be calculated from the resultant value of the pore diameter R in the polymer.

Here, the van der Waals radius of carbon dioxide is 0.23 nm (see A. Bondi, J. Phys. Chem. 68, 441, 1964), and the molecular volume of carbon dioxide is thus calculated from $4/3\pi R^3$, to which the value of the radius is assigned, and is 0.0509 nm$^3$.

The present inventors have made assiduous studies and, as a result, have found that, when the free volume of the polyamide resin composition as measured according to the positron annihilation method (hereinafter this may be referred to as "the free volume of the polyamide resin composition") is lowered to a predetermined value or less by adding the free volume modifier (B) to the composition, then the gas-barrier performance against carbon dioxide of the molded article using the resin composition can be extremely bettered.

The value of the free volume of the polyamide resin composition (1) is not needed to be less than the molecular volume of carbon dioxide (0.0509 nm$^3$), but when the value of the free volume could be controlled to be somewhat larger than the molecular volume of carbon dioxide, then the gas-barrier performance against carbon dioxide of the molded article using the resin composition can be improved.

In other words, the present inventors have found that, when the free volume of the polyamide resin composition (1) to be obtained here is controlled to be not more than 0.0545 nm$^3$, by suitably selecting and controlling the type and the amount of the free volume modifier (B), then the gas-barrier performance against oxygen, carbon dioxide and the like of the molded article formed by molding the resin composition (1) can be improved.

The FIGURE is a graph showing the relationship between the free volumes, as measured according to the positron annihilation method, of the polyamide resin compositions (1) prepared in Examples and Comparative Examples, and the carbon dioxide transmission rates of the unstretched films formed of the resin compositions.

From the graph in the FIGURE, it is known that, when the free volume of the polyamide resin composition (1) becomes smaller than 0.0545 nm$^3$, then the value of the carbon dioxide transmission rate of the unstretched film lowers and the gas-barrier performance against carbon dioxide of the film is thus improved.

The free volume of the polyamide resin composition (1) of the present invention is not more than 0.0545 nm$^3$, but is, from the viewpoint of improving the gas-barrier performance of the molded article, preferably 0.0540 nm$^3$ or less, more preferably 0.0535 nm$^3$ or less, even more preferably 0.0533 nm$^3$ or less.

From the graph in the FIGURE, it is known that, when the free volume of the polyamide resin composition (1) is not more than the above-mentioned value, then the carbon dioxide transmission rate of the unstretched film becomes smaller, and the gas-barrier performance of the unstretched film is thus improved.

The lower limit of the free volume of the polyamide resin composition (1) is not specifically limited.

For example, the free volume of the polyamide resin composition (1) using the polyamide (A1) to be mentioned below is generally 0.0509 nm$^3$ or more.

The value of the free volume of the polyamide resin composition (1) is a value determined according to a positron annihilation method using a high time-resolution positron lifetime measuring apparatus or the like, in which an unstretched film formed by molding the polyamide resin composition (1) is used as the test sample, and the lifetime ($\tau_3$) of ortho-positronium (o-Ps) is measured, and the free volume is calculated from the pore diameter R determined according to the above-mentioned formula (1), and concretely, the value is one determined according to the method described in the section of Examples.

The polyamide resin composition (1) of the present invention contains the polyamide (A) and the free volume modifier (B), and may further contain, in addition thereto, any other resin than the polyamide (A) and any other additive.

The polyamide (A) for use in the polyamide resin composition (1) is as described below.

<Polyamide (A)>

The polyamide (A) for use in the polyamide resin composition (1) may be any known polyamide that is prepared through polymerization of monomers of an amino acid, a ω-aminocarboxylic acid, a lactam or a diamine and a dicarboxylic acid.

Specific examples of the amino acid monomer include 6-aminocaproic acid, 11-aminoundecanoic acid, 12-aminododecanoic acid, paraaminomethylbenzoic acid, etc.; and specific examples of the lactam include ε-caprolactam, ω-laurolactam, etc.

Examples of the diamine monomer include an aliphatic diamine such as tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonamethylenediamine, etc.; an aromatic diamine such as metaxylylenediamine, paraxylylenediamine, etc.; an alicyclic diamine such as 1,3-bis(aminomethyl)cyclohexane, 1,4-bis(aminomethyl)cyclohexane, 1-amino-3-aminomethylhexane, 5,5-trimethylcyclohexane, bis(4-aminocyclohexyl)methane, bis(3-methyl-4-aminocyclohexyl) methane, 2,2-bis(4-aminocyclohexyl) propane, bis(aminopropyl)piperazine, aminoethylpiperazine, etc., but the examples are not limited thereto.

Examples of the dicarboxylic acid monomer include an aliphatic dicarboxylic acid such as succinic acid, glutaric acid, adipic acid, pimelic acid, suberic acid, azelaic acid, sebacic acid, dodecanedicarboxylic acid, cyclohexanedicarboxylic acid, decalindicarboxylic acid, norbornanedicarboxylic acid, etc.; an alicyclic dicarboxylic acid such as tricyclodecanedicarboxylic acid, pentacyclododecanedicarboxylic acid, isophoronedicarboxylic acid, 3,9-bis(2-carboxyethyl)-2,4,8,10-tetroxaspiro[5.5] undecane, etc.; an aromatic dicarboxylic acid such as trimellitic acid, trimesic acid, pyromellitic acid, tricarballylic acid, terephthalic acid, isophthalic acid, phthalic acid, 2-methylterephthalic acid, naphthalenedicarboxylic acid, biphenyldicarboxylic acid, tetralindicarboxylic acid, etc.; as well as their esters, etc., but the examples are not limited thereto.

Specific examples of the polyamide resin to be prepared from these monomers include polymetaxylyleneadipamide (polyamide MXD6), polycaproamide (nylon 6), polyhexamethylenadipamide (nylon 66), polyhexamethylenesebacamide (nylon 610), polyundecamethyleneadipamide (nylon 116), polyhexamethylenedodecamide (nylon 612), polyundecanamide (nylon 11), polydodecanamide (nylon 12), copolyamides of these, etc. One alone or two or more of these polyamide resins may be used here either singly or as combined.

The content of the polyamide (A) in the polyamide resin composition (1) is preferably 80% by mass or more, more preferably 85% by mass or more, even more preferably 90% by mass or more, still more preferably 95% by mass or more, and is preferably 99.995% by mass or less.

<Polyamide (A1)>

As the polyamide (A) for use in the polyamide resin composition (1), above all, preferred is a polyamide (A1) that contains a diamine unit containing an aromatic diamine unit represented by the following general formula (I) in an amount of 70 mol % or more, and a dicarboxylic acid unit containing at least one of an aromatic dicarboxylic acid unit represented by the following general formula (II-1) and a linear aliphatic dicarboxylic acid unit represented by the following general formula (II-2) in a total amount of 50 mol % or more.

Using the polyamide (A1) improves the gas-barrier performance of the molded article. In addition, the polyamide resin composition (1) containing the polyamide (A1) has a high crystallization temperature, and is therefore excellent in moldability into secondary molded articles such as PET bottles, stretched films, deep-drawn containers, etc.

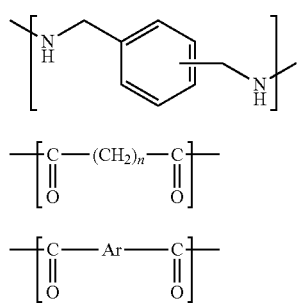

In the above general formula (II-1), n indicates an integer of from 2 to 18. In the above general formula (II-2), Ar represents an arylene group.

The content of the diamine unit in the polyamide (A1) is preferably from 20 to 65 mol %, more preferably from 25 to 60 mol % and even more preferably from 30 to 55 mol % relative to all the constituent units in the polyamide (A1), from the viewpoint of improving the moldability into secondary molded articles such as PET bottles, stretched films, deep-drawn containers and the like and in view of improving the gas-barrier performance of the molded articles.

The content of the dicarboxylic acid unit in the polyamide (A1) is preferably from 20 to 65 mol %, more preferably from 25 to 60 mol % and even more preferably from 30 to 55 mol % relative to all the constituent units in the polyamide (A1), from the same viewpoints as above.

The polyamide (A1) for use in the polyamide resin composition (1) may contain any other unit such as an ω-aminocarboxylic acid unit, a tertiary hydrogen-containing carboxylic acid unit and the like to be mentioned below, in addition to the diamine unit and the dicarboxylic acid unit. The polyamide (A1) preferably contains a tertiary hydrogen-containing carboxylic acid unit from the viewpoint of further improving the gas-barrier performance of the molded articles using the polyamide (A1).

The total amount of the diamine unit and the dicarboxylic acid unit in the polyamide (A1) is preferably from 70 to 100 mol %, more preferably from 80 to 100 mol %, even more preferably from 90 to 100 mol % relative to all the constituent units in the polyamide (A1).

[Diamine Unit]

The diamine unit in the polyamide (A1) preferably contains the aromatic diamine unit represented by the above-mentioned general formula (I) in an amount of 70 mol % or more, from the viewpoint of improving the gas-barrier performance, the transparency and the color tone of the molded articles obtained by using the polyamide (A1) and from the viewpoint of improving the moldability of the polyamide resin composition (1) containing the polyamide (A1).

The content of the aromatic diamine unit represented by the general formula (I) is preferably 70 mol % or more, more preferably 80 mol % or more, even more preferably 90 mol % or more relative to all the diamine units in the polyamide (A1), and is preferably 100 mol % or less.

The aromatic diamine to constitute the aromatic diamine unit represented by the general formula (I) includes orthoxylylenediamine, metaxylylenediamine, and paraxylylenediamine.

One alone or two or more of these may be used here either singly or as combined.

Metaxylylenediamine is preferred among them from the viewpoint of improving the gas-barrier performance of the molded articles obtained by using the polyamide (A1).

The content of the metaxylylenediamine-derived unit is, from the above-mentioned viewpoints, preferably 70 mol % or more, more preferably 80 mol % or more, even more preferably 90 mol % or more relative to all the diamine units in the polyamide (A1), and is preferably 100 mol % or less.

The compound that may constitute any other diamine unit than the aromatic diamine unit represented by the general formula (I) includes an aromatic diamine such as paraphenylenediamine, etc.; an aliphatic diamine such as 2-methyl-1,5-pentanediamine, 1-amino-3-aminomethyl-3,5,5-trimethylcyclohexane, etc.; an ether bond-having polyether diamine as typified by Huntsman's Jeffamine and Elastamine (both trade names), etc., but the examples are not limited thereto.

One alone or two or more different types of these may be used here either singly or as combined.

[Dicarboxylic Acid Unit]

The dicarboxylic acid unit in the polyamide (A1) preferably contains at least one of a linear aliphatic dicarboxylic acid unit represented by the above-mentioned general formula (II-1) and an aromatic dicarboxylic acid unit represented by the above-mentioned general formula (II-2) in a total amount of 50 mol % or more, from the viewpoint of improving the crystallinity of the resultant polyamide (A1) and improving the moldability of the polyamide resin composition containing the polyamide (A1).

The polyamide (A1) may contain, as the dicarboxylic acid unit therein, the linear aliphatic dicarboxylic acid unit alone represented by the general formula (II-1) in an amount of 50 mol % or more, or may contain the aromatic dicarboxylic acid unit alone represented by the general formula (II-2) in an amount of 50 mol % or more, or may contain both the linear aliphatic dicarboxylic acid unit and the aromatic dicarboxylic acid unit in a total amount of 50 mol % or more.

The total content of the linear aliphatic dicarboxylic acid unit represented by the general formula (II-1) and the aromatic dicarboxylic acid unit represented by the general formula (II-2) is preferably 50 mol % or more, more preferably 70 mol % or more, even more preferably 80 mol % or more, still more preferably 90 mol % or more, and is preferably 100 mol % or less, relative to all the dicarboxylic acid units in the polyamide (A1).

The compound capable of constituting any other dicarboxylic acid unit than the dicarboxylic acid unit represented by the general formula (II-1) or (II-2) includes oxalic acid, malonic acid, fumaric acid, maleic acid, 1,3-benzene-diacetic acid, 1,4-benzene-diacetic acid, etc., but the examples are not limited thereto. One alone or two or more of these may be used here either singly or as combined.

(Linear Aliphatic Dicarboxylic Acid Unit)

The polyamide (A1) for use in the present invention preferably contains the linear aliphatic dicarboxylic acid unit represented by the general formula (II-1) in a case where the polyamide (A1) is desired to have a suitable glass transition temperature and have a suitable degree of crystallinity and, in addition, the polyamide resin composition containing the polyamide (A1) is desired to have flexibility necessary for the wrapping/packaging material and the wrapping/packaging container to be formed of the resin composition.

In the general formula (II-1), n indicates an integer of from 2 to 18, and is preferably from 3 to 16, more preferably from 4 to 12, even more preferably from 4 to 8.

The linear aliphatic dicarboxylic acid to constitute the linear aliphatic dicarboxylic acid unit represented by the general formula (II-1) may be suitably selected depending on the intended use, and includes succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, etc., but the examples are not limited thereto. One alone or two or more of these may be used here either singly or as combined.

Of these, the linear aliphatic dicarboxylic acid unit preferably contains one or more selected from a group consisting of an adipic acid unit, a sebacic acid unit and a 1,12-dodecanedicarboxylic acid unit, from the viewpoint of imparting excellent gas-barrier performance to the molded articles obtained by using the polyamide (A1) and from the viewpoint of imparting heat resistance to the molded articles enough for thermal sterilization thereof.

The total content of the units selected from the group consisting of an adipic acid unit, a sebacic acid unit and a 1,12-dodecanedicarboxylic acid unit is, relative to all the linear aliphatic dicarboxylic acid units in the polyamide (A1), preferably 50 mol % or more, more preferably 70 mol % or more, even more preferably 80 mol % or more, still more preferably 90 mol % or more, and is preferably 100 mol % or less.

Further, the linear aliphatic dicarboxylic acid unit to be in the polyamide (A1) for use in the present invention preferably contains an adipic acid unit from the viewpoint of improving the gas-barrier performance of the molded articles obtained by using the polyamide (A1) and from the viewpoint of the thermal properties such as the glass transition temperature, the melting point and the like of the polyamide (A1).

The content of the adipic acid unit is, relative to all the linear aliphatic dicarboxylic acid units in the polyamide (A1), preferably 50 mol % or more, more preferably 70 mol % or more, even more preferably 80 mol % or more, still more preferably 90 mol % or more, and is preferably 100 mol % or less.

The linear aliphatic dicarboxylic acid unit to be in the polyamide (A1) for use in the present invention preferably contains a sebacic acid unit, from the viewpoint of imparting suitable gas-barrier performance to the molded articles using the polyamide (A1) and from the viewpoint of imparting suitable molding processability to the polyamide resin composition containing the polyamide (A1).

The content of the sebacic acid unit is, relative to all the linear aliphatic dicarboxylic acid units in the polyamide (A1), preferably 50 mol % or more, more preferably 70 mol % or more, even more preferably 80 mol % or more, still more preferably 90 mol % or more, and is preferably 100 mol % or less.

For the use in applications that require low water absorbability, weather resistance and heat resistance, the linear aliphatic dicarboxylic acid unit to be in the polyamide (A1) preferably contains a 1,12-dodecanedicarboxylic acid unit.

The content of the 1,12-dodecanedicarboxylic acid unit is, relative to all the linear aliphatic dicarboxylic acid units in the polyamide (A1), preferably 50 mol % or more, more preferably 70 mol % or more, even more preferably 80 mol % or more, still more preferably 90 mol % or more, and is preferably 100 mol % or less.

(Aromatic Dicarboxylic Acid Unit)

The polyamide (A1) for use in the present invention preferably contains an aromatic dicarboxylic acid unit represented by the above-mentioned general formula (II-2) for the purpose of imparting additional gas-barrier performance to the molded particles obtained by using the polyamide (A1) and for the purpose of improving the molding processability of the polyamide resin composition containing the polyamide (A1) into wrapping/packaging materials, wrapping/packaging containers, etc.

In the general formula (II-2), Ar represents an arylene group.

The arylene group is preferably an arylene group having from 6 to 30 carbon atoms, more preferably from 6 to 15 carbon atoms, including, for example, a phenylene group, a naphthylene group, an anthracene group, etc.

The aromatic dicarboxylic acid capable of constituting the unit represented by the general formula (II-2) may be suitably selected depending on the intended use thereof, and includes terephthalic acid, isophthalic acid, 2,6-naphthalenedicarboxylic acid, etc., but the examples are not limited thereto. One alone or two or more of these can be used here either singly or as combined.

From the viewpoint of imparting additional gas-barrier performance to the molded particles using the polyamide (A1) and improving the molding processability of the polyamide resin composition containing the polyamide (A1) into wrapping/packaging materials, wrapping/packaging containers and the like, the aromatic dicarboxylic acid unit preferably contains one or more selected from a group consisting of an isophthalic acid unit, a terephthalic acid unit and a 2,6-naphthalenedicarboxylic acid unit, more preferably an isophthalic acid and/or terephthalic acid.

The total content of the units selected from the group consisting of an isophthalic acid unit, a terephthalic acid unit and a 2,6-naphthalenedicarboxylic acid unit is, relative to all the aromatic dicarboxylic acid units in the polyamide (A1), preferably 50 mol % or more, more preferably 70 mol % or more, even more preferably 80 mol % or more, still more preferably 90 mol % or more, and is preferably 100 mol % or less.

As the dicarboxylic acid unit in the polyamide (A1) in the present invention, the linear aliphatic dicarboxylic acid unit represented by the general formula (II-1) and the aromatic dicarboxylic acid unit represented by the general formula (II-2) may be used in combination. In the case where the linear aliphatic dicarboxylic acid unit and the aromatic diamine unit are combined for use in the polyamide, the content ratio of the linear aliphatic dicarboxylic acid unit to the aromatic dicarboxylic acid unit (linear aliphatic dicarboxylic acid unit/aromatic dicarboxylic acid unit) may be suitably determined depending on the intended use.

Specifically, in a case where the glass transition temperature of the polyamide (A1) is desired to rise to thereby lower the crystallinity of the polyamide (A1), the content ratio of the linear aliphatic dicarboxylic acid unit represented by the general formula (II-1) to the aromatic dicarboxylic acid unit represented by the general formula (II-2) (linear aliphatic dicarboxylic acid unit/aromatic dicarboxylic acid unit) is preferably from 0/100 to 60/40, more preferably from 0/100 to 40/60, even more preferably from 0/100 to 30/70.

In a case where the glass transition temperature of the polyamide (A1) is desired to lower to thereby impart flexibility to the polyamide (A1), the content ratio of the linear aliphatic dicarboxylic acid unit represented by the general formula (II-1) to the aromatic dicarboxylic acid unit represented by the general formula (II-2) (linear aliphatic dicarboxylic acid unit/aromatic dicarboxylic acid unit) is preferably from 40/60 to 100/0, more preferably from 60/40 to 100/0, even more preferably from 70/30 to 100/0.

[Other Units]

The polyamide (A1) for use in the present invention may contain any other unit than the above-mentioned diamine unit and dicarboxylic acid unit.

The other unit includes a tertiary hydrogen-containing carboxylic acid unit, an ω-aminocarboxylic acid unit, etc.

Next described is the free volume modifier (B) to be contained in the polyamide resin composition (1) of the present invention.

<Free Volume Modifier (B)>

The free volume modifier (B) for use in the polyamide resin composition (1) means an additive having the function to lower the value of the free volume of the polyamide resin composition (1) to a predetermined value or less.

Whether or not the intended additive could correspond to the free volume modifier (B) in the present invention may be determined by the ratio of the value of the free volume (V) of the resin composition that contains 0.100 parts by mass of the subject additive and 100 parts by mass of a polyamide, to the value of the free volume ($V_0$) of the polyamide alone, ($V/V_0$). In the present invention, when the value of $V/V_0$ is 0.990 or less, then the subject additive corresponds to the "free volume modifier (B)" that is referred to in the present invention.

In the polyamide resin composition (1) of the present invention, the content of the free volume modifier (B) may be suitably varied depending on the type of the free volume modifier to be used, but from the viewpoint of lowering the value of the free volume of the polyamide resin composition (1) and improving the gas-barrier performance of the molded articles of the composition, the content is, relative to 100 parts by mass of the polyamide (A), preferably 0.005 parts by mass or more, more preferably 0.010 parts by mass or more, even more preferably 0.100 parts by mass or more, still more preferably 0.250 parts by mass or more, further more preferably 0.400 parts by mass or more. From the viewpoint of bettering the transparency of the molded articles of the polyamide resin composition, the content is preferably 2.000 parts by mass or less, more preferably 1.500 parts by mass or less, even more preferably 1.200 parts by mass or less, still more preferably 0.800 parts by mass or less.

In the present invention, the free volume modifier (B) is not specifically limited so far as it is an additive satisfying the above-mentioned definition. Preferred is a polysilsesquioxane whose main chain comprised of siloxane bonds. A polysilsesquioxane is significantly effective for lowering the value of the free volume of the polyamide resin composition. Accordingly, the molded articles formed by molding the polyamide resin composition (1) containing a polysilsesquioxane can be excellent in gas-barrier performance against oxygen, carbon dioxide and the like, especially in gas-barrier performance against carbon dioxide.

Furthermore, a polysilsesquioxane can lower the value of the free volume of the polyamide resin composition even when the amount thereof added to the composition is small, and in addition, can improve the transparency of the molded articles. The details of the polysilsesquioxane to be used in the polyamide resin composition (1) are those of the polysilsesquioxane (B1) to be described hereinunder.

In the polyamide resin composition (1) of the present invention, the polysilsesquioxane content is, from the viewpoint of lowering the value of the free volume of the polyamide resin composition (1) and improving the bas-barrier performance of the molded articles, preferably 0.005 parts by mass or more relative to 100 parts by mass of the polyamide (A), more preferably 0.010 parts by mass or more, even more preferably 0.100 parts by mass or more, still more preferably 0.250 parts by mass or more, further more preferably 0.400 parts by mass or more.

On the other hand, from the viewpoint of bettering the transparency of the molded articles to be formed by molding the polyamide resin composition (1), the content of the polysilsesquioxane is, relative to 100 parts by mass of the polyamide (A), preferably 2.000 parts by mass or less, more preferably 1.500 parts by mass or less, even more preferably 1.200 parts by mass or less, still more preferably 0.800 parts by mass or less.

Having the constitution as mentioned above, the polyamide resin composition (1) of the present invention can be a molding material to give molded articles that are excellent in gas-barrier performance against carbon dioxide, oxygen or the like, especially excellent in gas-barrier performance against carbon dioxide.

Next described is the polyamide resin composition of the second aspect of the present invention, as a polyamide resin composition (2).

[Polyamide Resin Composition (2)]

The polyamide resin composition (2) of the present invention contains a polyamide (A2) and a polysilsesquioxane (B1) whose main chain is comprised of siloxane bonds.

The polyamide resin composition (2) of the present invention may further contain any other additive or any other resin than the polyamide (A2).

(Polyamide (A2))

<Polyamide (A2)>

The polyamide (A2) to be contained in the polyamide resin composition (2) of the present invention is a polyamide that contains a diamine unit containing an aromatic diamine unit represented by the following general formula (I) in an amount of 70 mol % or more, and a dicarboxylic acid unit containing at least one of an aromatic dicarboxylic acid unit represented by the following general formula (II-1) and a linear aliphatic dicarboxylic acid unit represented by the following general formula (II-2) in a total amount of 50 mol % or more.

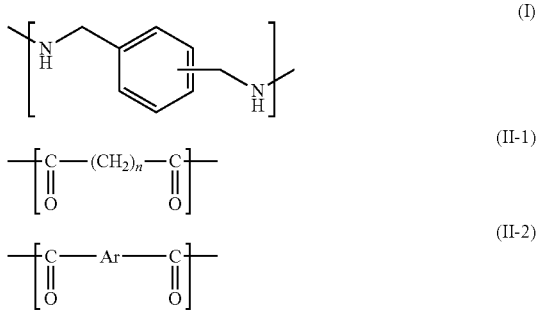

In the above general formula (II-1), n indicates an integer of from 2 to 18. In the above general formula (II-2), Ar represents an arylene group.

The content of the diamine unit in the polyamide (A2) is preferably from 20 to 60 mol %, more preferably from 25 to 55 mol % and even more preferably from 30 to 50 mol % relative to all the constituent units in the polyamide (A2), from the viewpoint of improving the moldability into stretched films, deep-drawn cups and the like and improving the gas-barrier performance of the molded articles, and in view of the polymer properties.

The content of the dicarboxylic acid unit in the polyamide (A2) is preferably from 20 to 60 mol %, more preferably from 25 to 55 mol % and even more preferably from 30 to 50 mol % relative to all the constituent units in the polyamide (A2), from the same viewpoints as above.

The molar ratio of the content of the diamine unit to that of the dicarboxylic acid unit (diamine unit/dicarboxylic acid unit) is, from the viewpoint of polymerization reaction, generally from 49.5/50.5 to 50.5/49.5, but from the viewpoint of facilitating the increase in the polymerization degree of the polyamide and preventing thermal degradation of the polyamide, preferably from 49.7/50.3 to 50.3/49.7, more preferably from 49.8/50.2 to 50.2/49.8, even more preferably from 49.5/50.5 to 50.5/49.5.

When the molar ratio of the content falls within the above range, then the polymerization degree of the polyamide can readily increase and therefore the time for increasing the polymerization degree can be thereby shortened and the thermal degradation of the polyamide can be prevented.

The polyamide (A2) for use in the polyamide resin composition (2) may contain any other unit than the diamine unit and the dicarboxylic acid unit. The other unit includes a tertiary hydrogen-containing carboxylic acid unit, an oyaminocarboxylic acid unit, etc.

The polyamide (A2) preferably contains a tertiary hydrogen-containing carboxylic acid unit from the viewpoint of further improving the gas-barrier performance of the molded articles such as stretched films, deep-drawn cups, etc.

The total amount of the diamine unit and the dicarboxylic acid unit in the polyamide (A2) is preferably from 70 to 100 mol %, more preferably from 80 to 100 mol %, even more preferably from 90 to 100 mol % relative to all the constituent units in the polyamide (A2).

[Diamine Unit]

The diamine unit in the polyamide (A2) for use in the polyamide resin composition (2) preferably contains the aromatic diamine unit represented by the above-mentioned general formula (I) in an amount of 70 mol % or more, from the viewpoint of imparting excellent gas-barrier performance to the polyamide (A2) and, in addition thereto, from the viewpoint of improving the transparency and the color tone of the molded articles and imparting good moldability.

The content of the aromatic diamine unit represented by the general formula (I) is 70 mol % or more relative to all the diamine units in the polyamide (A2) and is preferably 70 mol % or more, more preferably 80 mol % or more, even more preferably 90 mol %, and is preferably 100 mol % or less.

The aromatic diamine to constitute the unit represented by the general formula (I) includes orthoxylylenediamine, metaxylylenediamine, and paraxylylenediamine.

One alone or two or more of these may be used here either singly or as combined.

Metaxylylenediamine is preferred among them from the viewpoint of expressing excellent gas-barrier performance and bettering the moldability in the case of being mixed with an ordinary thermoplastic resin.

The content of the metaxylylenediamine-derived unit is, from the above-mentioned viewpoints, preferably 50 mol % or more, more preferably 70 mol % or more, even more preferably 80 mol % or more, still more preferably 90 mol % or more relative to all the diamine units in the polyamide (A2), and is preferably 100 mol % or less.

The compound that may constitute any other diamine unit than the aromatic diamine unit represented by the general formula (I) includes an aromatic diamine such as paraphenylenediamine, etc.; an aliphatic diamine such as 2-methyl-1,5-pentanediamine, 1-amino-3-aminomethyl-3,5,5-trimethylcyclohexane, etc.; an ether bond-having polyether diamine as typified by Huntsman's Jeffamine and Elastamine (both trade names), etc., but the examples are not limited thereto. One alone or two or more different types of these may be used here either singly or as combined.

[Dicarboxylic Acid Unit]

The dicarboxylic acid unit in the polyamide (A2) for use in the polyamide resin composition (2) contains at least one of a linear aliphatic dicarboxylic acid unit represented by the above-mentioned general formula (II-1) and an aromatic dicarboxylic acid unit represented by the above-mentioned general formula (II-2) in a total amount of 50 mol % or more, from the viewpoint of improving the reactivity in polymerization as well as the crystallinity of the resultant polyamide (A2) and the moldability.

The polyamide (A2) for use in the present invention may contain, as the dicarboxylic acid unit therein, the linear aliphatic dicarboxylic acid unit alone represented by the general formula (II-1) in an amount of 50 mol % or more, or may contain the aromatic dicarboxylic acid unit alone represented by the general formula (II-2) in an amount of 50 mol % or more, or may contain both the linear aliphatic dicarboxylic acid unit and the aromatic dicarboxylic acid unit in a total amount of 50 mol % or more.

The total content of the linear aliphatic dicarboxylic acid unit and the aromatic dicarboxylic acid unit is preferably 70 mol % or more relative to all the carboxylic acid units in the polyamide (A2), more preferably 80 mol % or more, even more preferably 90 mol % or more, and is preferably 100 mol % or less.

The compound capable of constituting any other dicarboxylic acid unit than the dicarboxylic acid unit represented by the general formula (II-1) or (II-2) includes oxalic acid, malonic acid, fumaric acid, maleic acid, 1,3-benzene-diacetic acid, 1,4-benzene-diacetic acid, etc., but the examples are not limited thereto. One alone or two or more of these may be used here either singly or as combined.

In the dicarboxylic acid unit in the polyamide (A2) in the polyamide resin composition (2), the content ratio of the linear aliphatic dicarboxylic acid unit to the aromatic dicarboxylic acid unit (linear aliphatic dicarboxylic acid unit/aromatic dicarboxylic acid unit) may be suitably determined depending on the intended use.

Specifically, in a case where the glass transition temperature of the polyamide (A2) is desired to rise to thereby lower the crystallinity of the polyamide (A2), the content ratio of the linear aliphatic dicarboxylic acid unit to the aromatic dicarboxylic acid unit (linear aliphatic dicarboxylic acid unit/aromatic dicarboxylic acid unit) is preferably from 0/100 to 60/40, more preferably from 0/100 to 40/60, even more preferably from 0/100 to 30/70.

In a case where the glass transition temperature of the polyamide (A2) is desired to lower to thereby impart flexibility to the polyamide (A2), the content ratio of the linear aliphatic dicarboxylic acid unit to the aromatic dicarboxylic acid unit (linear aliphatic dicarboxylic acid unit/aromatic dicarboxylic acid unit) is preferably from 40/60 to 100/0, more preferably from 60/40 to 100/0, even more preferably from 70/30 to 100/0.

(Linear Aliphatic Dicarboxylic Acid Unit)

The polyamide (A2) for use in the polyamide resin composition (2) preferably contains the linear aliphatic dicarboxylic acid unit represented by the general formula (II-1) in a case where the polyamide (A2) is desired to have a suitable glass transition temperature and have a suitable degree of crystallinity and, in addition, the polyamide resin composition is desired to have flexibility necessary for wrapping/packaging materials and wrapping/packaging containers.

In the general formula (II-1), n indicates an integer of from 2 to 18, and is preferably from 3 to 16, more preferably from 4 to 12, even more preferably from 4 to 8.

The linear aliphatic dicarboxylic acid to constitute the unit represented by the general formula (II-1) may be suitably selected depending on the intended use, and includes succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, etc., but the examples are not limited thereto. One alone or two or more of these may be used here either singly or as combined.

The linear aliphatic dicarboxylic acid unit preferably contains one or more selected from a group consisting of an adipic acid unit, a sebacic acid unit and a 1,12-dodecanedicarboxylic acid unit, from the viewpoint of imparting excellent gas-barrier performance to the polyamide (A2) and, in addition thereto, from the viewpoint of securing the heat resistance after thermal sterilization of the wrapping/packaging materials and wrapping/packaging containers.

The total content of the units selected from the group consisting of an adipic acid unit, a sebacic acid unit and a 1,12-dodecanedicarboxylic acid unit is, relative to all the linear aliphatic dicarboxylic acid units in the polyamide (A2), preferably 50 mol % or more, more preferably 70 mol % or more, even more preferably 80 mol % or more, still more preferably 90 mol % or more, and is preferably 100 mol % or less.

Further, the linear aliphatic dicarboxylic acid unit to be in the polyamide (A2) for use in the polyamide resin composition (2) preferably contains an adipic acid unit from the viewpoint of the gas-barrier performance and the suitable thermal properties such as the glass transition temperature and the melting point, of the polyamide (A2).

The content of the adipic acid unit is, relative to all the linear aliphatic dicarboxylic acid units in the polyamide (A2), preferably 50 mol % or more, more preferably 70 mol % or more, even more preferably 80 mol % or more, still more preferably 90 mol % or more, and is preferably 100 mol % or less.

The linear aliphatic dicarboxylic acid unit to be in the polyamide (A2) for use in the polyamide resin composition (2) preferably contains a sebacic acid unit, from the viewpoint of imparting suitable gas-barrier performance and molding processability to the polyamide (A2).

The content of the sebacic acid unit is, relative to all the linear aliphatic dicarboxylic acid units in the polyamide (A2), preferably 50 mol % or more, more preferably 70 mol % or more, even more preferably 80 mol % or more, still more preferably 90 mol % or more, and is preferably 100 mol % or less.

In a case where the resin composition is used for applications that require low water absorbability, weather resistance and heat resistance, the linear aliphatic dicarboxylic acid unit preferably contains a 1,12-dodecanedicarboxylic acid unit.

The content of the 1,12-dodecanedicarboxylic acid unit is, relative to all the linear aliphatic dicarboxylic acid units in the polyamide (A2), preferably 50 mol % or more, more preferably 70 mol % or more, even more preferably 80 mol % or more, still more preferably 90 mol % or more, and is preferably 100 mol % or less.

(Aromatic Dicarboxylic Acid Unit)

The polyamide (A2) for use in the polyamide resin composition (2) preferably contains an aromatic dicarboxylic acid unit represented by the above-mentioned general formula (II-2) for the purpose of imparting additional gas-barrier performance to the polyamide (A2) and, in addition thereto, for the purpose of improving the molding processability into wrapping/packaging materials and wrapping/packaging containers.

In the general formula (II-2), Ar represents an arylene group.

The arylene group is preferably an arylene group having from 6 to 30 carbon atoms, more preferably from 6 to 15 carbon atoms, including, for example, a phenylene group, a naphthylene group, an anthracene group, etc.

The aromatic dicarboxylic acid capable of constituting the unit represented by the general formula (II-2) may be suitably selected depending on the intended use thereof, and includes terephthalic acid, isophthalic acid, 2,6-naphthalenedicarboxylic acid, etc., but the examples are not limited thereto. One alone or two or more of these can be used here either singly or as combined.

The aromatic dicarboxylic acid unit preferably contains one or more selected from a group consisting of an isophthalic acid unit, a terephthalic acid unit and a 2,6-naphthalenedicarboxylic acid unit, from the viewpoint of imparting additional gas-barrier performance to the polyamide (A2) and, in addition, improving the molding processability of the composition into wrapping/packaging materials and wrapping/packaging containers.

The total content of the units selected from the group consisting of an isophthalic acid unit, a terephthalic acid unit and a 2,6-naphthalenedicarboxylic acid unit is, relative to all the aromatic dicarboxylic acid units in the polyamide (A2), preferably 50 mol % or more, more preferably 70 mol % or more, even more preferably 80 mol % or more, still more preferably 90 mol % or more, and is preferably 100 mol % or less.

In addition, further, as the aromatic dicarboxylic acid unit, preferably contained are isophthalic acid and/or terephthalic acid.

The content ratio of the isophthalic acid unit to the terephthalic acid unit (isophthalic acid unit/terephthalic acid unit) is, from the viewpoint of suitably lowering the glass transition temperature and the crystallinity, preferably from 0/100 to 100/0, more preferably from 0/100 to 60/40, even more preferably from 0/100 to 40/60, still more preferably from 0/100 to 30/70.

The polysilsesquioxane (B1) to be contained in the polyamide resin composition (2) of the present invention is a polysilsesquioxane (B1) whose main chain is comprised of siloxane bonds.

It is presumed that, in the polyamide resin composition (2) of the present invention, a polysilsesquioxane (B1) is dispersed in a size of from 0.5 to 10 nm or so, and in particular, the polysilsesquioxane (B1) occupies the free volume portion of the polyamide (A2) to improve the gas-barrier performance.

In the polyamide resin composition (2) of the present invention, the polysilsesquioxane (B1) is added in an amount of from 0.005 to 1.200 parts by mass relative to 100 parts by mass of the polyamide (A2) therein.

When the amount is less than 0.005 parts by mass, then the gas-barrier performance of the molded articles formed by molding the resultant polyamide resin composition is poor. On the other hand, when the amount is more than 1.200 parts by mass, the transparency of the molded articles formed by molding the resultant polyamide resin composition worsens.

From the above-mentioned viewpoints, the amount of the polysilsesquioxane (B1) to be added is preferably from 0.007 to 1.100 parts by mass relative to 100 parts by mass of the polyamide (A2), more preferably from 0.008 to 1.050 parts by mass, even more preferably from 0.010 to 0.500 parts by mass.

Having the constitution as mentioned above, the polyamide resin composition (2) of the present invention can be a molding material to give molded articles that have good transparency and are excellent in gas-barrier performance against oxygen, carbon dioxide, water vapor or the like (especially excellent in gas-barrier performance in high-humidity environments), not lowering the moldability into stretched films, deep-drawn cups, etc.

[Polysilsesquioxane (B1)]

Next, further described in detail is the polysilsesquioxane (B1) for use in the above-mentioned polyamide resin compositions (1) and (2).

The polysilsesquioxane (B1) is a compound represented by the following general formula (b):

$$(RSiO_{1.5})_n \quad (b)$$

In the above formula (b), R represents a monovalent group, and may be the same or different from each other. n indicates an integer represented by (2m+4) (where m indicates an integer of 1 or more), and is preferably an even number of from 6 to 30, more preferably an even number of from 6 to 18, still more preferably an even number of from 6 to 12.

In other words, the polysilsesquioxane means a polysiloxane which is a silicon-containing polymer having a main chain comprised of siloxane bonds, provided that the polysiloxane has a T unit (the silicon atom in the silsesquioxane bonds to three oxygen atoms and the oxygen atom in the silsesquioxane bond to two silicon atoms) as a basic constituent unit.

The monovalent group represented by R in the above formula (b) includes, for example, a hydrogen atom, a halogen atom, a hydroxyl group, an amino group, an imide group, an alkenyl group, an alkynyl group, a cyano group, a nitro group, an alkyl group having from 1 to 10 carbon atoms, a cycloalkyl group having from 3 to 12 carbon atoms, an aryl group having from 6 to 18 carbon atoms, an arylalkyl group having from 6 to 24 carbon atoms, a polyalkyleneoxy group having from 2 to 10 carbon atoms, an alkylcarbonyl group having an alkyl group with from 1 to 10 carbon atoms, an alkyl (meth)acrylate having an alkyl group with from 1 to 10 carbon atoms, an alkoxy group having from 1 to 10 carbon atoms, an aryloxy group having from 6 to 18 carbon atoms, a siloxane, such as a silane or the like, etc.

In these monovalent groups, the hydrogen atom may be substituted with a substituent.

The substituent includes hydroxy, halogen atom, amine, imine, ammonium, cyano, pyridine, pyridinium, ether, epoxy, glycidyl, aldehyde, ketone, ester, amide, carbonyl, carboxyl, imide, thiocarbonyl, sulfate, sulfonate, sulfonic acid, sulfide, sulfoxide, phosphine, phosphonium, phosphate, nitrile, mercapto, nitro, nitroso, sulfone, acyl, acid anhydride, azide, azo, cyanate, isocyanate, thiocyanate, isothiocyanate, carboxylate, carboxylic acid, urethane, urea, alkyl, aryl, arylalkyl, alkylaryl, silyl, siloxyl, silane, etc.

The monovalent group may have a hetero atom such as oxygen, nitrogen, sulfur, silicon, phosphorus, boron, etc.

Of the monovalent groups represented by R in the above formula (b), preferred is a hydrogen atom, a hydroxyl group, an alkyl group having from 1 to 10 carbon atoms, or an aryl group having from 6 to 24 carbon atoms.

The alkyl group having from 1 to 10 carbon atoms includes a methyl group, an ethyl group, a propyl group, an n-butyl group, an i-butyl group, a t-butyl group, a pentyl group, a hexyl group, an octyl group, etc. Preferred are a methyl group, an ethyl group, a propyl group and a butyl group; and more preferred are a methyl group and an ethyl group.

The aryl group having from 6 to 24 carbon atoms includes a phenyl group, a biphenyl group, a terphenyl group, a naphthyl group, etc. Preferred is an aryl group having from 6 to 12 carbon atoms; and more preferred is a phenyl group.

The silicon-oxygen skeleton in the polysilsesquioxane molecule contains plural ring structures, in which each silicon atom bonds to one organic group and three oxygen atoms thereby forming a completely condensed polycyclic structure.

The polysilsesquioxane (B1) includes a compound having a structure such as a random structure, a ladder structure, a cage structure, etc. From the viewpoint of effectively lowering the value of the free volume of the polyamide resin composition and improving the gas-barrier performance against carbon dioxide and the like, preferred is a compound having a cage structure or a ladder structure, and more preferred is a compound having a cage structure.

Hereinafter described are a polysilsesquioxane having a cage structure preferred as the structure that the polysilsesquioxane (B) has, and a polysilsesquioxane having a ladder structure also preferred as the above.

[Polysilsesquioxane Having Cage Structure]

As a compound having a cage structure, for example, there are mentioned a polysilsesquioxane represented by the following formula (b-I-1A) that is a compound of the formula (b) where n is 8, and a polysilsesquioxane represented by the following formula (b-I-1B) that is a compound of the formula (b) where n is 12, but the examples are not limited thereto.

As the polysilsesquioxane having a cage structure, the compounds of the formula (b) where n is 8 or 12 as mentioned below are exemplified here. The other compounds having a cage structure where n is any other than 8 and 12 may also have the same steric structures, and the same as above shall apply also to the types of the preferred steric structures and functional groups of those other compounds.

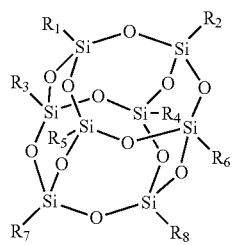

(b-I-1A)

In the above formula (b-I-1A), $R_1$ to $R_8$ each are independently the same as R in the above formula (b). $R_1$ to $R_8$ may bond to each other to form a ring.

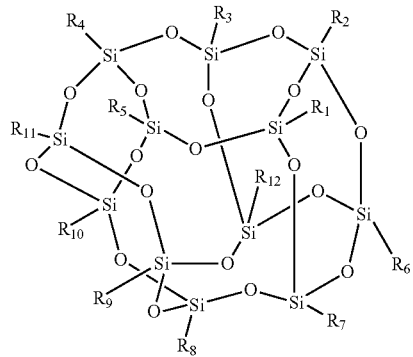

(b-I-1B)

In the above formula (b-I-1B), $R_1$ to $R_{12}$ each are independently the same as R in the above formula (b). $R_1$ to $R_{12}$ may bond to each other to form a ring.

As the polysilsesquioxane (B1), preferred is a polysilsesquioxane having a cage structure in which one or more bonds to form the cage structure are cleaved to provide a silicon atom and/or an oxygen atom which further have a substituent, for effectively lowering the value of the free volume of the polyamide resin composition and for improving the gas-barrier performance against carbon dioxide of the molded articles.

As the polysilsesquioxane of the type represented by the formula (b) where n is 8, there is mentioned a polysilsesquioxane represented by the following formula (b-I-2A) or (b-I-3A) where one or more bonds to form the cage structure of the polysilsesquioxane represented by the formula (b-I-1A) are cleaved.

As the polysilsesquioxane where one or more bonds to form the cage structure are cleaved, a case of the formula (b) where n is 8 is described below as an example. However, not only a case of the formula (b) where n is 12 but also other cases of the formula where n is any other than 8 and 12 may have the same type of a steric structure, and the same as above shall apply also to the types of the preferred steric structures and functional groups of those other compounds.

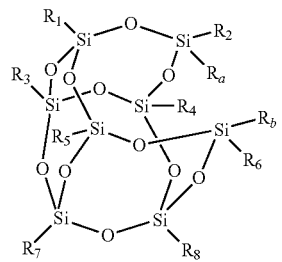

(b-I-2A)

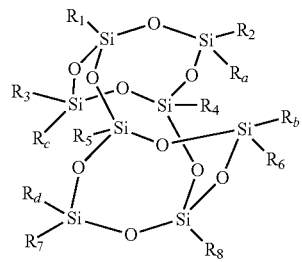

(b-I-3A)

In the above formula (b-I-2A) and b-I-3A), $R_1$ to $R_8$, and $R_a$ to $R_d$ are the same as R in the formula (b).

Further, in a case of the formula (b) where n is 8, a polysilsesquioxane represented by the following formula (b-I-4A) or (b-I-5A) is preferred as the polysilsesquioxane represented by the above-mentioned formula (b-I-2A) or (b-I-3A).

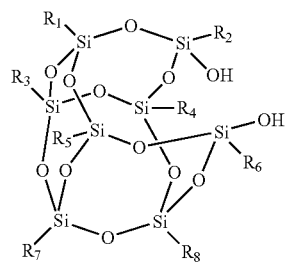

(b-I-4A)

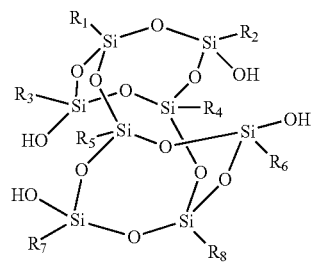

(b-I-5A)

In the above formula (b-I-4A) and b-I-5A), $R_1$ to $R_8$ are the same as R in the formula (b).

As the polysilsesquioxane (B1), also preferred is a polysilsesquioxane having a cage structure in which one or more of silicon atoms and/or oxygen atoms to form the cage structure are lost to provide a silicon atom and/or an oxygen atom which further have a substituent, for effectively lowering the value of the free volume of the polyamide resin composition and for improving the gas-barrier performance against carbon dioxide of the molded articles of the composition.

As the polysilsesquioxane of the type represented by the formula (b) where n is 8, there is mentioned a polysilsesquioxane represented by the following formula (b-I-6A) where one or more of the silicon atom and the oxygen atom to form the cage structure of the polysilsesquioxane represented by the formula (b-I-1A) are lost and a substituent is further attached to the silicon atom and the oxygen atom.

As the polysilsesquioxane where one or more of the silicon atom and the oxygen atom to form the cage structure are lost and a substituent is attached to the silicon atom and the oxygen atom, a case of the formula (b) where n is 8 is described below as an example. However, not only a case of the formula (b) where n is 12 but also other cases of the formula (b) where n is any other than 8 and 12 may have the same type of a steric structure, and the same as above shall apply also to the types of the preferred steric structures and functional groups of those other compounds.

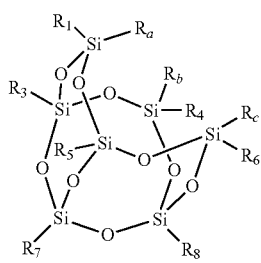

(b-I-6A)

In the above formula (b-I-6A), $R_1$, $R_3$ to $R_8$, and $R_a$ to $R_c$ each are independently the same as R in the above formula (b).

Further, in a case of the formula (b) where n is 8, a polysilsesquioxane represented by the following formula (b-I-7A) is preferred as the polysilsesquioxane represented by the above-mentioned formula (b-I-6A).

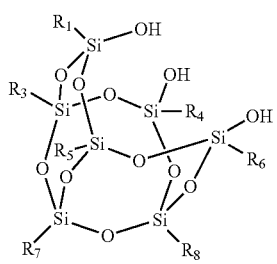

(b-I-7A)

In the above formula (b-I-7A), $R_1$, and $R_3$ to $R_8$ each are independently the same as R in the above formula (b).

$R_1$ to $R_{12}$ and $R_a$ to $R_d$ in the above formulae (b-I-1A) to (b-I-7A) and the formula (b-I-1B) each are preferably an alkyl group having from 1 to 10 carbon atoms, or an aryl group having from 6 to 40 carbon atoms, more preferably, at least one of these is an aryl group having from 6 to 40 carbon atoms, and even more preferably, every one of these is an aryl group having from 6 to 40 carbon atoms.

The hydrogen atom in the aryl group may be substituted with the above-mentioned substituent.

The alkyl group is preferably an alkyl group having from 1 to 6 carbon atoms, and more preferably an alkyl group having from 1 to 3 carbon atoms.

The aryl group is preferably an aryl group having from 6 to 12 carbon atoms, and more preferably a phenyl group.

Consequently, all of $R_1$ to $R_{12}$ and $R_a$ to $R_d$ in the above formulae (b-I-1A) to (b-I-7A) and the formula (b-I-1B) are more preferably phenyl groups.

The molecular weight (formula weight) of the polysilsesquioxane having a cage structure is preferably from 300 to 10000, more preferably from 500 to 7000, even more preferably from 700 to 5000, still more preferably from 800 to 3000.

[Polysilsesquioxane Having Ladder Structure]

As the polysilsesquioxane having a ladder structure, preferred is a polysilsesquioxane having a structural unit represented by the following formula (b-II).

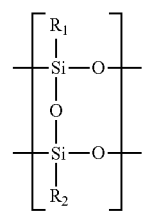

(b-II)

In the above formula (b-II), $R_1$ and $R_2$ each are independently the same as R in the above formula (b), but are preferably an alkyl group having from 1 to 10 carbon atoms or an aryl group having from 6 to 40 carbon atoms. More preferably at least one of these is an aryl group having from 6 to 40 carbon atoms, and even more preferably every one of these is an aryl group having from 6 to 40 carbon atoms.

The hydrogen atom in the aryl group may be substituted with the above-mentioned substituent.

The alkyl group is preferably an alkyl group having from 1 to 6 carbon atoms, and more preferably an alkyl group having from 1 to 3 carbon atoms.

The aryl group is preferably an aryl group having from 6 to 12 carbon atoms, and more preferably a phenyl group. Consequently, both of $R_1$ and $R_2$ are more preferably phenyl groups.

In a case where the terminal of the polysilsesquioxane having the structural unit represented by the above formula (b-II) is expressed as —Si—OR', R' is preferably a hydrogen atom, an alkyl group having from 1 to 6 carbon atoms, or a phenyl group, and is more preferably a hydrogen atom, a methyl group or an ethyl group.

The weight-average molecular weight (Mw) of the polysilsesquioxane having the structural unit represented by the formula (b-II) is preferably from 300 to 10000, more preferably from 400 to 5000, even more preferably from 450 to 2500.

The weight-average molecular weight (Mw) is a polystyrene-equivalent value measured according to a gel permeation chromatography (GPC) method.

From the viewpoint of increasing the compatibility thereof with polyamide, the polysilsesquioxane (B1) may be copolymerized or graft-polymerized with any other polymer.

So far as not having any influence of dehydration and dealcoholation during extrusion, the polysilsesquioxane (B1) may have, as remaining therein, a reactive terminal group such as a hydroxyl group, an alkoxy group or the like.

As commercial products of the polysilsesquioxane (B1), there are mentioned SR series by Konishi Chemical Ind. Co., Ltd., SQ series by Toa Gosei Co., Ltd., Compoceran SQ series by Arakawa Chemical Industries, Ltd., POSS (registered trademark) series by Hybrid Chemical Co., Ltd., etc.

The polysilsesquioxane (B1) is generally produced by hydrolysis of a trialkoxysilane followed by solution-to-sol conversion and sol-to-gel conversion, but the production method is not limited thereto.

[Other Units in Polyamides (A2) and (A1)]

(Tertiary Hydrogen-Containing Carboxylic Acid Unit)

The tertiary hydrogen-containing carboxylic acid unit preferably contained in the above-mentioned polyamide (A1) and (A2) is, from the viewpoint of polymerization to give the polyamides (A1) and (A2) and from the viewpoint of more improving the gas-barrier performance of the molded articles such as stretched films, deep-drawn cups and the like of the composition, preferably a unit having at least one amino group and at least one carboxyl group, or a unit having two carboxyl groups. As specific examples, preferred is a unit represented by any of the following general formulae (III), (IV) or (V).

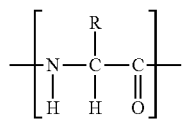   (III)

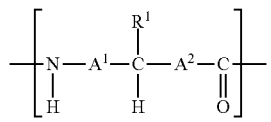   (IV)

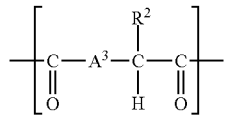   (V)

In the above-mentioned general formulae (III) to (V), R, $R^1$ and $R^2$ each independently represent a substituent such as a halogen atom, an alkyl group, an alkenyl group, an alkynyl group, an aryl group, a heterocyclic group, a cyano group, a hydroxyl group, a nitro group, an alkoxy group, an aryloxy group, an acyl group, an amino group, a mercapto group, an alkylthio group, an arylthio group, a heterocyclic-thio group, an imide group, etc. $A^1$ to $A^3$ each independently represent a single bond or a divalent linking group. However, in the general formula (IV), a case where $A^1$ and $A^2$ are both single bonds is excluded.

The halogen atom includes, for example, a chlorine atom, a bromine atom, an iodine atom, etc.

The alkyl group includes a linear, branched or cyclic alkyl group having from 1 to 15 (preferably from 1 to 6) carbon atoms, for example, a methyl group, an ethyl group, an n-propyl group, an isopropyl group, a t-butyl group, an n-octyl group, a 2-ethylhexyl group, a cyclopropyl group, a cyclopentyl group, etc.

The alkenyl group includes a linear, branched or cyclic alkenyl group having from 2 to 10 (preferably from 2 to 6) carbon atoms, for example, a vinyl group, an allyl group, etc.

The alkynyl group includes an alkynyl group having from 2 to 10 (preferably from 2 to 6) carbon atoms, for example, an ethynyl group, a propargyl group, etc.

The aryl group includes an aryl group having from 6 to 18 (preferably from 6 to 10) nuclear carbon atoms or an aryl group having from 6 to 16 (preferably from 6 to 10) carbon atoms, for example, a phenyl group and a naphthyl group.

The heterocyclic group includes a monovalent group having from 1 to 12 carbon atoms, preferably from 2 to 6 carbon atoms, which is derived from a 5-membered or 6-membered aromatic or nonaromatic heterocyclic compound by removing one hydrogen atom from the compound, for example, a 1-pyrazolyl group, a 1-imidazolyl group and a 2-furyl group.

The alkoxy group includes a linear, branched or cyclic alkoxy group having from 1 to 10 (preferably from 1 to 6) carbon atoms, for example, a methoxy group and an ethoxy group.

The aryloxy group includes an aryloxy group having from 6 to 12 (preferably from 6 to 8) carbon atoms, for example, a phenoxy group.

The acyl group includes a formyl group, an alkylcarbonyl group having from 2 to 10 (preferably from 2 to 6) carbon atoms, or an arylcarbonyl group having from 7 to 12 (preferably from 7 to 9) carbon atoms, for example, an acetyl group, a pivaloyl group, a benzoyl group, etc.

The amino group includes an amino group, an alkylamino group having from 1 to 10 (preferably from 1 to 6) carbon atoms, an anilino group having from 6 to 12 (preferably from 6 to 8) carbon atoms, or a heterocyclic amino group having from 1 to 12 (preferably from 2 to 6) carbon atoms, for example, an amino group, a methylamino group, an anilino group, etc.

The alkylthio group includes an alkylthio group having from 1 to 10 (preferably from 1 to 6) carbon atoms, for example, a methylthio group and an ethylthio group.

The arylthio group includes an arylthio group having from 6 to 12 (preferably from 6 to 8) carbon atoms, for example, a phenylthio group.

The heterocyclic thio group includes a heterocyclic thio group having from 2 to 10 (preferably from 1 to 6) carbon atoms, for example, a 2-benzothiazolylthio group.

The imide group is preferably an imide group having from 2 to 10 (preferably from 4 to 8) carbon atoms, for example, an N-succinimide group, an N-phthalimide group, etc.

In those having a hydrogen atom of the above-mentioned substituents, the hydrogen atom may be further substituted with any of the above-mentioned groups. For example, there are mentioned an alkyl group substituted with a hydroxyl group (for example, a hydroxyethyl group), an alkyl group substituted with an alkoxy group (for example, a methoxyethyl group), an alkyl group substituted with an aryl group (for example, a benzyl group), an aryl group substituted with an alkyl group (for example, a p-tolyl group), an aryloxy group substituted with an alkyl group (for example, a 2-methylphenoxy group), etc.

In the case where the hydrogen atom in the substituent is further substituted, the carbon number mentioned above does not contain the carbon number of the substituted group. For example, a benzyl group is considered to be an alkyl group having one carbon atom and substituted with a phenyl group, and this is not considered to be an alkyl group having 7 carbon atoms substituted with a phenyl group. Unless otherwise specifically indicated, the same shall apply to the description of the carbon number to be mentioned hereinunder.

The divalent linking group includes, for example, a linear, branched or cyclic alkylene group (an alkylene group having from 1 to 12 carbon atoms, preferably from 1 to 4 carbon atoms, for example, a methylene group, an ethylene group), an aralkylene group (an aralkylene group having from 7 to 30 carbon atoms, preferably from 7 to 13 carbon atoms, for example, a benzylidene group), an arylene group (an arylene group having from 6 to 30 carbon atoms, preferably from 6 to 15 carbon atoms, for example, a phenylene group), etc.

These linking groups may further have a substituent, and as examples of the substituent, referred to are the groups exemplified hereinabove for the substituents R, $R^1$ and $R^2$.

The polyamide preferably contains at least one structural unit represented by any of the above-mentioned general formula (III), (IV) or (V). Of those, more preferably, the polyamide contains a carboxylic acid unit having a tertiary hydrogen at the α-carbon (the carbon atom adjacent to the carboxyl group), from the viewpoint of the availability of the materials and from the viewpoint of more improving the gas-barrier performance of the molded articles such as stretched films, deep-drawn cups and the like of the composition, and even more preferably, the polyamide contains the unit represented by the general formula (III).

R in the general formula (III) is as described above, and is preferably a substituted or unsubstituted alkyl group or a substituted or unsubstituted aryl group, more preferably a substituted or unsubstituted alkyl group having from 1 to 6 carbon atoms or a substituted or unsubstituted aryl group having from 6 to 12 carbon atoms, and even more preferably a substituted or unsubstituted alkyl group having from 1 to 4 carbon atoms or a substituted or unsubstituted phenyl group.

Preferred examples of R include a methyl group, an ethyl group, an n-propyl group, an isopropyl group, an n-butyl group, a t-butyl group, a 1-methylpropyl group, a 2-methylpropyl group, a hydroxymethyl group, a 1-hydroxyethyl group, a mercaptomethyl group, a methylsulfanylethyl group, a phenyl group, a naphthyl group, a benzyl group, a 4-hydroxybenzyl group, etc., but the examples are not limited thereto. Of those, more preferred is a methyl group, an ethyl group, a 2-methylpropyl group, and a benzyl group.

The compound capable of constituting the unit represented by the general formula (III) includes α-amino acids such as alanine, 2-aminobutyric acid, valine, norvaline, leucine, norleucine, tert-leucine, isoleucine, serine, threonine, cysteine, methionine, 2-phenylglycine, phenylalanine, tyrosine, histidine, tryptophane, proline, etc., but the examples are not limited thereto.

The compound capable of constituting the unit represented by the general formula (IV) includes β-amino acids such as 3-aminobutyric acid, etc., but the examples are not limited thereto.

The compound capable of constituting the unit represented by the general formula (V) includes dicarboxylic acids such as methylmalonic acid, methylsuccinic acid, malic acid, tartaric acid, etc., but the examples are not limited thereto.

The compounds capable of constituting the unit represented by the general formula (III), (IV) or (V) may be any of a D-form, an L-form or a racemic form, and may also be an allo form. One alone or two or more of these may be used here either singly or as combined.

Of those, from the viewpoint of the availability of the materials and from the viewpoint of improving more the gas-barrier performance of the molded articles such as stretched films, deep-drawn cups and the like of the composition, preferred are α-amino acids having a tertiary hydrogen at the α-carbon; and from the viewpoint of the easiness in supply, the inexpensiveness, the easiness in polymerization and the low yellow index (YI) of the polymer, alanine is more preferred.

The purity of the compound capable of constituting the tertiary hydrogen-containing carboxylic acid unit is, from the viewpoint of the influence of the compound on polymerization such as delay of polymerization rate or the like and from the viewpoint of the influence of the compound on the quality such as the yellow index or the like of the polymer, preferably 95% or more, more preferably 98.5% or more, even more preferably 99% or more.

The content of the sulfate ion and the ammonium ion that are contained in the compound capable of constituting the tertiary hydrogen-containing carboxylic acid unit, as impurities therein, is preferably 500 ppm or less, more preferably 200 ppm or less, even more preferably 50 ppm or less.

The content of the tertiary hydrogen-containing carboxylic acid unit in the polyamide (A1) or (A2) is, from the viewpoint of improving more the gas-barrier performance of the molded articles such as stretched films, deep-drawn cups and the like of the polyamide, preferably from 0.1 to 30 mol % relative to all the constituent units in the polyamide (A1) or (A2), more preferably from 1 to 20 mol %, even more preferably from 2 to 10 mol %.

(ω-Aminocarboxylic Acid Unit)

The polyamide (A1) or (A2) for use in the present invention may further contain an ω-aminocarboxylic acid unit represented by the following general formula (A), from the viewpoint of improving the flexibility of the composition.

(A)

In the above-mentioned general formula (A), p indicates an integer of from 2 to 18, and is preferably from 3 to 16, more preferably from 4 to 14, even more preferably from 5 to 12.

The compound capable of constituting the ω-aminocarboxylic acid unit represented by the general formula (A) includes an ω-aminocarboxylic acid having from 5 to 19 carbon atoms, a lactam having from 5 to 19 carbon atoms, etc.

The ω-aminocarboxylic acid having from 5 to 19 carbon atoms includes 6-aminohexanoic acid, 12-aminododecanoic acid, etc.

The lactam having from 5 to 19 carbon atoms includes ε-caprolactam, laurolactam, etc. One alone or two or more of these may be used here either singly or as combined.

The content of the ω-aminocarboxylic acid unit in each of the polyamides (A1) and (A2) is, relative to all the constituent units in each of the polyamides (A1) and (A2), preferably from 0.1 to 30 mol %, more preferably from 1 to 20 mol %, even more preferably from 2 to 10 mol %.

The total of the diamine unit, the dicarboxylic acid unit, the tertiary hydrogen-containing carboxylic acid unit and the ω-aminocarboxylic acid unit must not be more than 100 mol %.

Preferably, the ω-aminocarboxylic acid unit contains a 6-aminohexanoic acid unit and/or a 12-aminododecanoic acid unit.

The total content of the 6-aminohexanoic acid unit and the 12-aminododecanoic acid unit is, relative to all the ω-aminocarboxylic acid units, preferably 50 mol % or more, more preferably 70 mol % or more, even more preferably 80 mol % or more, still more preferably 90 mol % or more, and is preferably 100 mol % or less.

[Degree of Polymerization (Relative Viscosity) of Polyamide (A1), (A2)]

The relative viscosity of polyamide is an index of the degree of polymerization thereof.

The relative viscosity of each of the polyamides (A1) and (A2), is from the viewpoint of the appearance and the molding processability of the molded articles of the composition, preferably from 1.5 to 4.2, more preferably from 1.7 to 4.0, even more preferably from 1.9 to 3.8.

The relative viscosity of polyamide as referred to herein is a ratio of the dropping time (t) of 0.2 g of polyamide dissolved in 20 mL of 96 mass % sulfuric acid, measured with a Canon Fenske viscometer at 25° C., to the dropping time (to) of 96% sulfuric acid alone measured similarly, and is expressed by the following equation.

$$\text{Relative Viscosity} = t/t_0$$

[Terminal Amino Group Concentration of Polyamide (A1), (A2)]

The terminal amino group concentration of each of the polyamides (A1) and (A2) is, from the viewpoint of bettering the moldability of the resultant polyamide resin composition into secondary molded articles such as stretched films, deep-drawn cups, PET bottles, etc., and bettering the gas-barrier performance of the resultant molded articles, preferably from 5 to 150 μeq/g, more preferably from 10 to 100 μeq/g, even more preferably from 15 to 80 μeq/g.

The terminal amino group concentration of the polyamide (A1) or (A2) means the value measured according to the method described in the section of Examples.

[Glass Transition Temperature (Tg) and Melting Point (Tm) of Polyamide (A1), (A2)]

The glass transition temperature (Tg) of each of the polyamides (A1) and (A2) is preferably from 60 to 140° C., more preferably from 70 to 120° C., even more preferably from 80 to 100° C.

The melting point (Tm) of each of the polyamides (A1) and (A2) is preferably from 190 to 270° C., more preferably from 210 to 255° C., even more preferably from 220 to 240° C.

The glass transition temperature (Tg) and the melting point (Tm) of polyamide means the value measured according to the method described in the section of Examples.

[Production Method for Polyamides (A1) and (A2)]

The polyamides (A1) and (A2) for use in the present invention each may be produced through polycondensation of a diamine component capable of constituting the diamine unit, a dicarboxylic acid component capable of constituting the dicarboxylic acid unit, and optionally a tertiary hydrogen-containing carboxylic acid component capable of constituting the tertiary hydrogen-containing carboxylic acid unit, an ω-aminocarboxylic acid component capable of constituting the ω-aminocarboxylic acid unit and any other component capable of constituting any other unit. By controlling the polycondensation condition, the degree of polymerization of the resultant polyamide may be controlled.

By controlling the polycondensation condition, the degree of polymerization of the resultant polyamide may be controlled. A small amount of a monoamine or a monocarboxylic acid may be added during polycondensation, as a molecular weight regulator.

For controlling the polycondensation reaction to attain the desired degree of polymerization, the ratio (by mol) of the diamine component and the carboxylic acid component to constitute the polyamide (A) may be made to deviate from 1.

The molar ratio of the diamine component to the dicarboxylic acid component to be incorporated (diamine component/dicarboxylic acid component) is, from the viewpoint of polymerization reaction, generally from 49.5/50.5 to 50.5/49.5, but from the viewpoint of readily increasing the degree of polymerization of the resultant polyamide and preventing the polyamide from being thermally degraded, preferably from 49.7/50.3 to 50.3/49.7, more preferably from 49.8/50.2 to 50.2/49.8.

When the molar ratio falls within the above range, then the degree of polymerization of the produced polyamide can be readily increased, and therefore the time for increasing the degree of polymerization can be shortened and the polyamide may be prevented from being thermally degraded.

The polycondensation method for the polyamides (A1) and (A2) includes a reactive extrusion method, a pressurized salt method, a normal-pressure instillation method, a pressurized instillation method, etc., but the examples are not limited thereto. Of those polycondensation methods, preferred are a normal-pressure instillation method and a pressurized instillation method.

The reaction temperature may be one not lower than the melting point of the polyamides (A1) and (A2), but is preferably as low as possible because the polyamides (A1) and (A2) can be prevented from yellowing or gelling, and the polyamides (A1) and (A2) can have stable properties.

Concretely, the reaction temperature is preferably from 180 to 300° C., more preferably from 200 to 270° C.

A normal-pressure instillation method and a pressurized instillation method that are preferred as the polycondensation method for the polyamides (A1) and (A2) in the present invention are described below.

(Normal-Pressure Instillation Method)

In a normal-pressure instillation method, a diamine component is continuously added dropwise to a mixture produced by heating and melting a dicarboxylic acid component, any other component, sodium hypophosphite and sodium acetate, under normal pressure for polycondensation with removing the condensation water. During the polycondensation reaction, preferably the reaction system is heated in order that the reaction temperature is not lower than the melting point of the polyamide to be produced.

In the normal-pressure instillation method, the yield per batch is large as compared with that in a pressurized salt method where the starting material of a nylon salt is polycondensed in melt under pressure because the method does not require water for salt dissolution, and in addition, since the degree of vaporization of the starting material components in the method is low and therefore the method does not require condensation of the starting material components, the reaction rate decreases little and the process time can be shortened, and thus the method is preferred.

(Pressurized Instillation Method)

In a pressurized instillation method, first a dicarboxylic acid component, any other component, sodium hypophosphite and sodium acetate are put into a polycondensation reactor, and then the components are stirred and mixed in melt to produce a mixture. Next, while the reactor is pressurized preferably up to from 0.3 to 0.4 MPaG or so, a diamine component is continuously added dropwise to the mixture for polycondensation with removing the condensation water. During the polycondensation reaction, preferably, the reaction system is heated in order that the reaction temperature is not lower than the melting point of the polyamide to be produced. After the components have reached a predetermined molar ratio, the addition of the diamine component is finished. While the reactor is gradually restored to normal pressure, the system therein is heated up to around a temperature of (melting point+10° C.) of the polyamide to be produced, and kept as such. Subsequently, while the reactor is gradually depressurized to 0.02 MPaG, the system therein is kept as such at the temperature to continue the polycondensation. After the system has reached a predetermined stirring torque, the reactor was pressurized with nitrogen up to 0.3 MPaG or so and the polyamide (A1) or (A2) is then collected.

Like the pressurized salt method, the pressurized instillation method is useful in a case where a volatile component is used as the monomer, and is a preferred polycondensation method for the case where the copolymerization ratio of the other components is high.

The pressurized instillation method is preferred as capable of giving the polyamide (A1) or (A2) having excellent properties, since the method can prevent vaporization of the other components, can prevent polycondensation of the other components therebetween and can promote the intended polycondensation smoothly.

Further, different from the pressurized salt method, the pressurized instillation method does not require water for salt dissolution and therefore the yield per batch according to the method is large. In addition, in the method, the reaction time can be shortened and therefore the system can be prevented from gelling, like in the normal-pressure instillation method. Accordingly, the polyamides (A1) and (A2) having a low yellow index can be obtained.

(Step of Increasing Degree of Polymerization)

The polyamides (A1) and (A2) produced according to the above-mentioned polycondensation method can be used directly as they are, however, the compounds may be processed in a step of further increasing the degree of polymerization thereof. The step of increasing the degree of polymerization includes reactive extrusion in an extruder and solid-phase polymerization.

As the heating apparatus for use for solid-phase polymerization, any known apparatus can be sued. As the apparatus, preferred are a continuous heating and drying apparatus; a rotary drum-type heating apparatus such as a tumble drier, a conical drier, a rotary drier etc.; and a conical heating apparatus equipped with a rotary blade inside it, such as a Nauta mixer.

Of those, preferred is a rotary drum-type heating apparatus, since the system can be airtightly sealed up and the polycondensation can be readily promoted therein in a condition where oxygen to cause discoloration is eliminated.

(Phosphorus Atom-Containing Compound, Alkali Metal Compound)

In polycondensation to produce the polyamides (A1) and (A2) in the present invention, preferred is adding a phosphorus atom-containing compound from the viewpoint of promoting the amidation reaction.

Examples of the phosphorus atom-containing compound include phosphinic acid compounds such as dimethylphosphinic acid, phenylmethylphosphinic acid, etc.; hypophosphorous acid compounds such as hypophosphorous acid, sodium hypophosphite, potassium hypophosphite, lithium hypophosphite, magnesium hypophosphite, calcium hypophosphite, ethyl hypophosphite, etc.; phosphonic acid compounds such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, etc.; phosphonous acid compounds such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite, ethyl phenylphosphonite, etc.; phosphorous acid compounds such as phosphorous acid, sodium hydrogenphosphite, sodium phosphite, lithium phosphite, potassium phosphite, magnesium phosphite, calcium phosphite, triethyl phosphite, triphenyl phosphite, pyrophosphorous acid, etc., but the examples are not limited thereto.

Among these, particularly preferred are metal hypophosphites such as sodium hypophosphite, potassium hypophosphite, lithium hypophosphite or the like, as their effect of promoting amidation is high and their effect of preventing discoloration is excellent. More preferred is sodium hypophosphite.

The amount of the phosphorus atom-containing compound to be added is preferably from 0.1 to 1,000 ppm by mass in terms of the phosphorus atom concentration in the polyamide (A1) or (A2), more preferably from 1 to 600 ppm by mass, even more preferably from 5 to 400 ppm by mass.

When the amount is 0.1 ppm or more, the polyamide (A1) or (A2) is hardly discolored during polymerization and the transparency thereof could be high. When the amount is 1,000 ppm or less, the polyamide (A1) or (A2) hardly gels and, in addition, incorporation of few fish eyes that may be caused by the phosphorus atom-containing compound can be suppressed in the molded articles, and therefore, the appearance of the molded articles could be good.

Moreover, preferably, an alkali metal compound is added to the polycondensation system to give the polyamide (A1) or (A2), along with the phosphorus atom-containing compound thereto, from the viewpoint of controlling the amidation rate and preventing the polyamide from gelling.

The alkali metal compound is preferably an alkali metal hydroxide, an alkali metal acetate, an alkali metal carbonate, or an alkali metal alkoxide.

The alkali metal hydroxide includes lithium hydroxide, sodium hydroxide, potassium hydroxide, rubidium hydroxide, cesium hydroxide, etc.

The alkali metal acetate includes lithium acetate, sodium acetate, potassium acetate, rubidium acetate, cesium acetate, etc.

The alkali metal carbonate includes sodium carbonate, etc.

The alkali metal alkoxide includes sodium methoxide, sodium ethoxide, sodium propoxide, sodium butoxide, potassium methoxide, lithium methoxide, etc.

The content ratio (molar ratio) of alkali metal compound to the phosphorus atom-containing compound [alkali metal compound/phosphorus atom-containing compound] is, from the viewpoint of controlling the polymerization rate and reducing the yellow index of the polyamide, preferably from 0.05/1.0 to 1.5/1.0, more preferably from 0.1/1.0 to 1.2/1.0, even more preferably from 0.2/1.0 to 1.1/1.0.

<Other Additives>

Depending on the desired use and performance, the polyamide resin compositions (1) and (2) of the present invention may contain any other additives than the free volume modifier (B) and the polysilsesquioxane (B1), within a range not detracting from the advantageous effects of the present invention.

Examples of the other additives include a lubricant, a crystallization nucleating agent, a whitening inhibitor, a delustering agent, a heat-resistant stabilizer, a weatherresistant stabilizer, a UV absorbent, a plasticizer, a flame retardant, an antistatic agent, a discoloration inhibitor, an antioxidant, an impact resistance improver, etc.

The content of the other additives in the polyamide resin composition of the present invention may be suitably limited in accordance with the type of the additive, but is, relative to 100 parts by mass of the polyamide (A) or (A2) in the composition, preferably from 0 to 8 parts by mass, more preferably from 0 to 4 parts by mass, even more preferably from 0 to 1 part by mass.

<Other Resins>

The polyamide resin compositions (1) and (2) of the present invention may contain any other resin than the polyamide (A) and the polyamide (A2), respectively, therein.

As the other resin, a thermoplastic resin may be incorporated. Concretely, the resin includes polyolefins, polyesters, polyamides having a structure except that of the above-mentioned polyamide (A2) in the resin composition (2), ethylene-vinyl alcohol copolymers, vegetable-derived resins, etc.

The content of the other resin in the polyamide resin composition of the present invention is, relative to 100 parts by mass of the polyamide (A) or (A2) therein, preferably from 0 to 20 parts by mass, more preferably from 0 to 10 parts by mass, even more preferably from 0 to 5 parts by mass, still more preferably from 0 to 2 parts by mass.

<Production Method for Polyamide Resin Composition>

The polyamide resin compositions (1) and (2) may be produced by mixing the above-mentioned polyamide (A2) or polyamide (A) and the polysilsesquioxane (B1) or the free volume modifier (B), and optionally adding thereto the above-mentioned other resins and other additives, mixing them, and melt-kneading the resultant mixture in an extruder, etc.

As the mixing method, employable here is any heretofore-known method. From the viewpoint of the production cost and from the viewpoint of preventing the resin from being degraded by thermal history, preferred is a dry-blending method.

As a concrete mixing method, for example, there is mentioned a method of putting the above-mentioned components in a tumbler and rotating the tumbler to mix the components therein.

From the viewpoint of preventing the polyamide and the additives from being classified after dry mixing, a viscous liquid serving as a spreading agent may be first adhered to the polyamide and then the polysilsesquioxane (B1) or the free volume modifier (B) and other optional components may be added thereto and mixed.

As the spreading agent, there is mentioned a surfactant and the like, but not limited thereto, any known one is employable here.

Prior to the mixing process, the polyamide and other resins, and the polysilsesquioxane (B1) or the free volume modifier (B) and other additives may be previously melt-kneaded in an extruder and then pelletized to prepare a master batch, which may be used here.

<Physical Properties of Polyamide Resin Composition>

The polyamide resin compositions (1) and (2) of the present invention each have a glass transition temperature (Tg) of preferably from 60 to 140° C., more preferably from 70 to 120° C., even more preferably from 80 to 100° C.

The polyamide resin compositions (1) and (2) of the present invention each have a melting point (Tm) of preferably from 190 to 270° C., more preferably from 210 to 255° C., even more preferably from 220 to 240° C.

The exothermic peak temperature (crystallization temperature, Tch) of the polyamide resin compositions (1) and (2) of the present invention in heating through DSC is, from the viewpoint of bettering the moldability of the resin composition into secondary molded articles, preferably 140° C. or higher, more preferably 145° C. or higher.

The exothermic peak temperature (crystallization temperature, Tcc) of the polyamide resin compositions (1) and (2) of the present invention in cooling through DSC is preferably 190° C. or lower.

The values of Tg, Tm, Tch and Tcc of the polyamide resin composition are values determined according to the methods described in the section of Examples, in which an unstretched film formed by molding the polyamide resin composition is used as a test sample.

[Molded Article]

The molded article of the present invention is one obtained by molding the above-mentioned polyamide resin composition (1) or (2) of the present invention.

The molded article of the present invention includes wrapping/packaging materials such as sheets, films, etc.; wrapping/packaging containers such as bottles, trays, cups, tubes, various types of pouches such as flat bags, standing pouches, etc., but the examples are not limited thereto.

The molded article of the polyamide resin composition (1) or (2) of the present invention may also be used as at least a partial constituent member to constitute wrapping/packaging materials, wrapping/packaging containers, etc. For example, a filmy or sheet-like molded article of the polyamide resin composition of the present invention may be used as at least a partial constituent member (for example, handle member, container body member, outer surface member, inner surface member, etc.) to constitute wrapping/packaging containers such as bottles, trays, cups, tubes, various types of pouches such as flat bags, standing pouches, etc.

The thickness of the molded article of the present invention is not specifically limited, but is preferably 1 μm or more.

The molded article of the present invention includes secondary molded articles to be formed by further stretching and/or thermoforming a molded article formed of the polyamide resin composition of the present invention (primary molded article).

The secondary molded article of the type includes, for example, a stretched film formed by stretching and/or thermoforming an unstretched film (primary molded article), a bottle-shaped wrapping/packaging container formed by stretching and/or thermoforming a preform (primary molded article), etc., and concretely, there are mentioned PET bottles, stretched films, deep-drawn containers, etc.

The production method for the molded article of the present invention is not specifically limited, for which any method is employable. For example, for forming a filmy or sheet-like wrapping/packaging material, or forming a tubular wrapping/packaging material, the polyamide resin composition may be melted through a T-die, a circular die or the like, and then extruded out through the extruder connected to the die.

For forming a container such as a tray, a cup or the like, there may be employed a method of injecting the polyamide resin composition after melted, into the mold of an injection-molding machine, and a method of molding a sheet-like wrapping/packaging material into the container in a mode of vacuum forming, air-pressure molding or the like. Not limited to the above-mentioned production methods, wrapping/packaging materials and wrapping/packaging containers may be produced via various steps.

The molded article (primary molded article) such as sheets, films, preforms or the like prepared according to the above-mentioned method may be further stretched and/or thermoformed to give secondary molded articles such as stretched films, bottle-shaped wrapping/packaging containers, etc.

The stretched film may be produced, for example, by stretching under heat the unstretched film (primary molded article) produced by extrusion of the polyamide resin composition that has been melted through a T-die, a circular die or the like, from the extruder connected to the die, using a stretching apparatus.

The bottle-shaped wrapping/packaging container may be produced by blow-stretching, with heating up to the stretching temperature thereof, the preform (primary molded article) prepared by injecting the polyamide resin composition after melted, into a mold from an injection-molding apparatus.

The molded article formed by molding the polyamide resin composition (1) of the present invention (hereinafter this may be referred to as molded article (1)) is excellent in gas-barrier performance against oxygen, carbon dioxide and the like and is especially excellent in gas-barrier performance against carbon dioxide. Consequently, the molded article is favorable for food wrapping/packaging containers such as PET bottles or the like for storing therein, a carbonated drink, beer, etc.

The carbon dioxide transmission rate of the unstretched film having a thickness of 100 μm that is a molded article (1) of the present invention is, after storage for 2 weeks in an atmosphere at 23° C. and 0% RH (relative humidity), preferably 2.40 (ml/atm·day·m$^2$) or less, more preferably 2.25 (ml/atm·day·m$^2$) or less, even more preferably 1.40 (ml/atm·day·m$^2$) or less, still more preferably 0.95 (ml/atm·day·m$^2$) or less.

The oxygen transmission rate of the unstretched film having a thickness of 100 μm that is a molded article (1) of the present invention is, after storage for 2 weeks in an atmosphere at 23° C. and 60% RH (relative humidity), preferably 0.80 (ml/atm·day·m$^2$) or less, more preferably 0.70 (ml/atm·day·m$^2$) or less, even more preferably 0.67 (ml/atm·day·m$^2$) or less, still more preferably 0.65 (ml/atm·day·m$^2$) or less.

The oxygen transmission rate of the unstretched film having a thickness of 100 μm that is a molded article (1) of the present invention is, after storage for 2 weeks in an atmosphere at 23° C. and 90% RH (relative humidity), preferably 1.84 (ml/atm·day·m$^2$) or less, more preferably 1.80 (ml/atm·day·m$^2$) or less, even more preferably 1.76 (ml/atm·day·m$^2$) or less, still more preferably 1.74 (ml/atm·day·m$^2$) or less.

The oxygen transmission rate after storage for 2 weeks in an atmosphere at 23° C. and 60% RH (relative humidity) of the stretched film having a thickness of 15 μm produced by further stretching and/or thermoforming an unstretched film (primary molded article), which is a secondary molded article molded based on the polyamide resin composition (1) of the present invention, is preferably 0.40 (ml/atm·day·m$^2$) or less, more preferably 0.37 (ml/atm·day·m$^2$) or less, even more preferably 0.33 (ml/atm·day·m$^2$) or less, still more preferably 0.31 (ml/atm·day·m$^2$) or less.

The haze of the unstretched film having a thickness of 50 μm that is a molded article (1) of the present invention is preferably 2.5 or less, more preferably 2.0 or less, even more preferably 1.5 or less, still more preferably 1.0 or less.

The molded article formed by molding the polyamide resin composition (2) of the present invention (hereinafter this may be referred to as molded article (2)) is excellent in gas-barrier performance against oxygen, carbon dioxide, water vapor and the like, and is also excellent in transparency.

The oxygen transmission rate of the unstretched film having a thickness of 100 μm that is a molded article (2) of the present invention is, after storage for 2 weeks in an atmosphere at 23° C. and 60% RH (relative humidity), preferably 0.80 (ml/atm·day·m$^2$) or less, more preferably 0.70 (ml/atm·day·m$^2$) or less, even more preferably 0.67 (ml/atm·day·m$^2$) or less.

The oxygen transmission rate of the unstretched film having a thickness of 100 μm that is a molded article (2) of the present invention is, after storage for 2 weeks in an atmosphere at 23° C. and 90% RH (relative humidity), preferably 1.84 (ml/atm·day·m$^2$) or less, more preferably 1.80 (ml/atm·day·m$^2$) or less, even more preferably 1.76 (ml/atm·day·m$^2$) or less.

The water vapor transmission rate of the unstretched film having a thickness of 100 μm that is a molded article (2) of the present invention is, after storage for 24 hours in an atmosphere at 40° C. and 90% RH (relative humidity), preferably 35 (ml/day·m$^2$) or less, more preferably 33 (ml/day·m$^2$) or less, even more preferably 32 (ml/day·m$^2$) or less.

The haze of the unstretched film having a thickness of 50 μm that is a molded article (2) of the present invention is preferably 2.5 or less, more preferably 2.1 or less, even more preferably 1.0 or less.

The oxygen transmission rate of the stretched film having a thickness of 15 μm produced by further stretching and/or thermoforming an unstretched film (primary molded article), which is a secondary molded article formed by molding the polyamide resin composition (2) of the present invention is, after storage for 2 weeks in an atmosphere at 23° C. and 60% RH (relative humidity), preferably 0.40 (ml/atm·day·m$^2$) or less, more preferably 0.37 (ml/atm·day·m$^2$) or less, even more preferably 0.33 (ml/atm·day·m$^2$) or less.

EXAMPLES

The present invention is described in more detail with reference to the following Examples; however, the present invention is not limited to these Examples.

In the following Examples, polymetaxylyleneadipamide may be referred to as "N-MXD6", and for the units constituting copolymers, if necessary, the following abbreviations are used.

"MXDA": metaxylylenediamine-derived unit
"AA": adipic acid-derived unit
"IPA": isophthalic acid-derived unit
"L-Ala": L-alanine-derived unit The respective physical properties in the following Production Examples, Examples and Comparative Examples were determined according to the methods mentioned below.

(1) Relative Viscosity of Polyamide 0.2 g of the polyamide was accurately weighed, and dissolved with stirring in 20 ml of 96 mass % sulfuric acid at 20 to 30° C. to prepare a completely dissolved solution. 5 ml of the prepared solution was rapidly taken in a Canon Fenske-type viscometer. This was left in a thermostat bath at 25° C. for 10 minutes, and then the dropping time (t) thereof was measured. The dropping time ($t_0$) of 96 mass % sulfuric acid was also measured in the same manner. From the found data of t and t0, the relative viscosity of the polyamide was calculated according to the following equation (a).

Relative Viscosity of Polyamide=$t/t_0$     (a)

(2) Terminal Amino Group Concentration of Polyamide 0.5 g of the polyamide was weighed accurately, dissolved in 30 ml of a solution of phenol/ethanol=4/1 (by volume) with stirring at 20 to 30° C. to prepare a completely dissolved solution. The inner wall of a chamber was washed with 5 ml of methanol with stirring, and this was titrated for neutralization with an aqueous solution of 0.01 mol/L hydrochloric acid thereby determining the terminal amino group concentration [$NH_2$] (unit: μ-equivalent/g) of the polyamide.

(3) Tg, Tm, Tch, Tcc of Polyamide and Polyamide Resin Composition

Using a differential scanning calorimeter (DSC-60, a trade name, manufactured by Shimadzu Corporation), the sample was analyzed through DSC (differential scanning calorimetry) in which the sample was heated from 10° C. up to 260° C. in a nitrogen current atmosphere at a heating rate of 10° C./min, then rapidly cooled with dry ice, then again heated from 10° C. up to 260° C. in a nitrogen current atmosphere at a heating rate of 10° C./min, stored as such for 5 minutes, and further cooled down to 120° C. at a cooling rate of −5° C./min, thereby determining the glass transition temperature (Tg) and the melting point (Tm) of the polyamide.

In addition, regarding the polyamide resin composition, the resin composition was formed into an unstretched film having a thickness of 100 μm, besides Tg and Tm thereof, the exothermic peak temperature (crystallization temperature) in heating (Tch) thereof and the exothermic peak temperature (crystallization temperature) in cooling (Tcc) thereof were also measured.

(4) Free Volume of Polyamide Resin Composition Determined According to Positron Annihilation Method 10 sheets of a 100-μm unstretched film were laid one upon another and fixed to prepare a test sample. Using a high time-resolution positron lifetime measuring apparatus by the Takasaki Advanced Radiation Research Institute of the Japan Atomic Energy Agency, the lifetime of ortho-positronium (o-Ps) $\tau_3$ was measured in an atmosphere of 25° C. and 50% RH (relative humidity). Based on the found value of $\tau_3$, the pore radius R in the polyamide resin or the polyamide resin composition was determined according to the above-mentioned formula (1), and the free volume (=$4/3\pi R^3$) of the polyamide resin or the polyamide resin composition was calculated according the positron annihilation method.

The unstretched film used in this test is a film of which the heat value in heating crystallization in DSC falls within a range of from 20 to 40 J/g, and the range could give an indication of nearly the same crystallization degree of the tested films.

(5) Carbon Dioxide Transmission Rate ($CO_2TR$) of Unstretched Film

Using a gas transmission rate measuring apparatus (manufactured by. Toyo Seiki Seisaku-sho, Ltd., trade name "Gas Transmission Rate Measuring Apparatus"), the carbon dioxide transmission rate ($CO_2TR$) of an unstretched film formed from the polyamide resin composition and having a thickness of 100 μm was measured, according to the differential-pressure method (gas pressure: 100 KPa) of JIS-K7126-1: 2006.

For the measurement, the unstretched film was stored in an atmosphere at 23° C. and 0% RH (relative humidity), and while stored, the carbon dioxide transmission rate of the unstretched film was measured continuously. The found value of the sample after storage for 2 weeks is referred to as the carbon dioxide transmission rate of the unstretched film in that atmosphere.

(6) Oxygen Transmission Rate (OTR) of Unstretched Film and Stretched Film

Using an oxygen transmission rate measuring apparatus (manufactured by MOCON Co., Ltd., trade name "OX-TRAN 2/21SH"), the oxygen transmission rate (OTR) of an unstretched film formed from the polyamide resin composition and having a thickness of 100 μm and a stretched film having a thickness of 15 μm thereof were measured, according to ASTM D3985.

For the measurement, the unstretched film was stored in an atmosphere at 23° C. and 60% RH (relative humidity) and in an atmosphere at 23° C. and 90% RH (relative humidity), and while stored, the oxygen transmission rate of the unstretched film was measured continuously. The found value of the sample after storage for 2 weeks is referred to as the oxygen transmission rate of the unstretched film in each atmosphere.

The stretched film was stored in an atmosphere at 23° C. and 60% RH (relative humidity), and while stored, the oxygen transmission rate of the stretched film was measured continuously. The found value of the sample after storage for 2 weeks is referred to as the oxygen transmission rate of the stretched film in that atmosphere.

(7) Haze of Unstretched Film

Using a haze meter (manufactured by Nippon Denshoku Industries Co., Ltd., trade name "COH-300A") and according to JIS-K-7105, the haze of an unstretched film formed from the polyamide resin composition and having a thickness of 50 μm was measured after stored in an atmosphere at 23° C. and 50% RH (relative humidity) for 1 week.

(8) Water Vapor Transmission Rate (WVTR) of Unstretched Film

Using a water vapor transmission rate measuring apparatus (manufactured by MOCON Co., Ltd., trade name "PERMA-TRAM"), the water vapor transmission rate (WVTR) of an unstretched film formed from the polyamide resin composition and having a thickness of 100 μm was measured continuously in an atmosphere at 40° C. and 90% RH (relative humidity), and the found value after 24 hours is referred to as the water vapor transmission rate thereof.

Production Example 1 (Production of Polyamide No. 1)

13000 g (88.95 mol) of accurately weighed adipic acid, 11.29 g (0.11 mol) of sodium hypophosphite, and 5.85 g (0.07 mol) of sodium acetate were put into a pressure-tight reactor having an internal cubic volume of 50 L and equipped with a stirrer, a partial condenser, a total condenser, a pressure controller, a thermometer, a driptank, a pump, an aspirator, a nitrogen-introducing duct, a bottom drain valve and a strand die, then fully purged with nitrogen, and thereafter the reactor was sealed up and heated up to 170° C. with stirring while the inside of the reactor was kept under 0.4 MPaG.

After reached 170° C., dropwise addition of 12040 g (88.42 mol) of metaxylylenediamine stored in the driptank to the melted materials in the reactor was started, then while the pressure inside the reactor was kept under 0.4 MPaG and while the formed condensation water was removed out of the system, the inside of the reactor was continuously heated up to 260° C.

After the dropwise addition of metaxylylenediamine, the inside of the reactor was gradually restored to normal pressure, and then via the aspirator, the inside of the reactor was depressurized to 80 kPaG and the condensation water was thus removed. During the pressure reduction, the stirring torque of the stirrer was monitored, and after the torque reached a predetermined level, the stirring was stopped, and then the reactor was pressurized with nitrogen. Then, the bottom drain valve was opened, and the polymer was discharged out through the strand die to be strands, and thereafter cooled and pelletized with a pelletizer.

Next, the pellets were put into a stainless rotary drum-type heating apparatus and rotated therein at 5 min$^{-1}$. With that, the reactor was fully purged with nitrogen, and further, under a small amount of nitrogen stream, the reaction system was heated from room temperature (23° C.) up to 150° C. At the time when the temperature inside the reaction system reached 150° C., the reactor was depressurized down to 1 Torr or less, and further, the reaction system was heated up to 190° C. taking 110 minutes. At the time when the temperature in the reaction system reached 180° C., the solid-phase polymerization was continued therein for 180 minutes at the temperature.

After the reaction, the depressurization was stopped, and the temperature inside the reaction system was lowered in a nitrogen stream atmosphere, and at 60° C., the pellets were taken out to give "polyamide No. 1", MXDA/AA copolymer (MXDA/AA=49.8/50.2 (mol %)).

Production Example 2 (Production of Polyamide No. 2)

According to the same process as in Production Example 1 except that, as the starting materials, 12120 g (82.94 mol) of adipic acid, 880 g (5.29 mol) of isophthalic acid (manufactured by AG International Chemical Co., Ltd.), 11.25 g (0.11 mol) of sodium hypophosphite, 5.83 g (0.07 mol) of sodium acetate and 11940 g (87.7 mol) of metaxylylenediamine were used, "Polyamide No. 2", MXDA/AA/IPA copolymer (MXDA/AA/IPA=49.8/47.2/3.0 (mol %)) was produced.

Production Example 3 (Production of Polyamide No. 3)

13000 g (88.95 mol) of accurately weighed adipic acid, 689 g (7.74 mol) of L-alanine, 22.35 g (0.21 mol) of sodium hypophosphite, and 13.84 g (0.17 mol) of sodium acetate were put into the same type of pressure-tight reactor having an internal cubic volume of 50 L as that used in Production Example 1, then fully purged with nitrogen, and thereafter the reactor was sealed up and heated up to 170° C. with stirring while the inside of the reactor was kept under 0.4 MPaG.

After reached 170° C., dropwise addition of 12110 g (88.94 mol) of metaxylylenediamine stored in the driptank to the melted materials in the reactor was started, then while the pressure inside the reactor was kept under 0.4 MPaG and while the formed condensation water was removed out of the system, the inside of the reactor was continuously heated up to 240° C.

After the dropwise addition of metaxylylenediamine, the inside of the reactor was gradually restored to normal pressure, and then via the aspirator, the inside of the reactor was depressurized to 80 kPaG to thereby remove the condensation water. During the pressure reduction, the stirring torque of the stirrer was monitored, and after the torque reached a predetermined level, the stirring was stopped, and then the reactor was pressurized with nitrogen. Then, the bottom drain valve was opened, and the polymer was discharged out through the strand die to be strands, and thereafter cooled and pelletized with a pelletizer.

Next, the pellets were put into a stainless rotary drum-type heating apparatus and rotated therein at 5 min$^{-1}$. With that, the reactor was fully purged with nitrogen, and further, under a small amount of nitrogen stream, the reaction system was heated from room temperature (23° C.) up to 140° C. At the time when the temperature inside the reaction system reached 140° C., the reactor was depressurized down to 1 Torr or less, and further, the reaction system was heated up to 180° C. taking 110 minutes. At the time when the temperature in the reaction system reached 180° C., the solid-phase polymerization was continued therein for 180 minutes at the temperature.

After the reaction, the depressurization was stopped, and the temperature inside the reaction system was lowered in a nitrogen stream atmosphere, and at 60° C., the pellets were taken out to give "polyamide No. 3", MXDA/AA/L-Ala copolymer (MXDA/AA/L-Ala=47.9/47.9/4.2 (mol %)).

The polyamides Nos. 1 to 3 thus produced in the manner as above were analyzed to measure, the relative viscosity, the terminal group concentration, the glass transition temperature (Tg) and the melting point (Tm) of the polyamides, based on the above-mentioned methods. The results are shown in Table 1.

TABLE 1

| | | | Unit | Production Example 1 | Production Example 2 | Production Example 3 |
|---|---|---|---|---|---|---|
| Polyamide No. | | | | 1 | 2 | 3 |
| Starting Monomer Components | Aromatic Diamine | metaxylylenediamine | mol % | 49.8 | 49.8 | 47.9 |
| | Aliphatic Dicarboxylic Acid | adipic acid | mol % | 50.2 | 47.2 | 47.9 |
| | Aromatic Dicarboxylic Acid | isophthalic acid | mol % | 0.0 | 3.0 | 0.0 |
| | α-Amino Acid | L-alanine | mol % | 0.0 | 0.0 | 4.2 |
| α-Amino Acid Content | | | mol % | 0.0 | 0.0 | 8.0 |
| Properties | Relative Viscosity | | | 2.6 | 2.7 | 2.0 |
| | Terminal Group Concentration | [NH2] | μeq/g | 16 | 43 | 68 |
| | Thermal Properties | Glass Transition Temperature Tg | ° C. | 87 | 90 | 87 |
| | | Melting Point Tm | ° C. | 237 | 229 | 230 |

[Polyamide Resin Composition (1)]

The polyamide resin composition (1) is described further in detail with reference to the following Examples 1A to 9A, and Comparative Examples 1A to 6A.

Examples 1A to 9A, Comparative Examples 1A to 6A

The free volume modifier (B) of the type and the amount shown in Table 2 was added to 100 parts by mass of the polyamide (A) of the type shown in Table 2, and dry-blended to give a polyamide resin mixture (1). In Comparative Example 1A, a component corresponding to the free volume modifier (B) is not incorporated.

Thus prepared, the polyamide resin mixture was put into a single-screw film production apparatus equipped with a full-flight twin-screw having a diameter of 25 mm, a feed block, a T-die, a chill roll, a winder and others, and extruded therethrough at 265° C. to give an unstretched film of the polyamide resin composition having a thickness of 100 μm or a thickness of 50 μm.

In the same manner as above, an unstretched film formed from the polyamide resin composition and having a thickness of from 235 to 245 μm was produced, and the unstretched film was stretched at a stretching temperature of 130° C. by 4 times in MD and 4 times in TD, using a biaxial stretching apparatus (by a tenter method, manufactured by Toyo Seiki Seisaku-sho, Ltd.), and then thermally fixed at 210° C. for 30 seconds to give a secondary molded article, a stretched film having a thickness of 15 μm.

The details of the components used in Examples and Comparative Examples described in Table 2 are as follows.
<Polyamide (A1)>
"No. 1": Polyamide No. 1 produced in Production Example 1.
"No. 2": Polyamide No. 2 produced in Production Example 2.
"No. 3": Polyamide No. 3 produced in Production Example 3.
<Free Volume Modifier (B) or Additive>
"B-1": Dodecaphenyl POSS (registered trademark) (product name, manufactured by Hybrid Chemical Co., Ltd., compound represented by the following formula (b1), molecular weight (formula weight): 1550.26).
"B-2": Trisilanophenyl POSS (registered trademark) (product name, manufactured by Hybrid Chemical Co., Ltd., compound represented by the following formula (b2), molecular weight (formula weight): 931.34).
"Talc": DG-5000 (product name, manufactured by Matsumura Sangyo Co., Ltd., powdery talc).
"Sorbitol": Millad NX8000 (product name, manufactured by Milliken Co., Ltd., bis(N-propylbenzylidene)sorbitol).

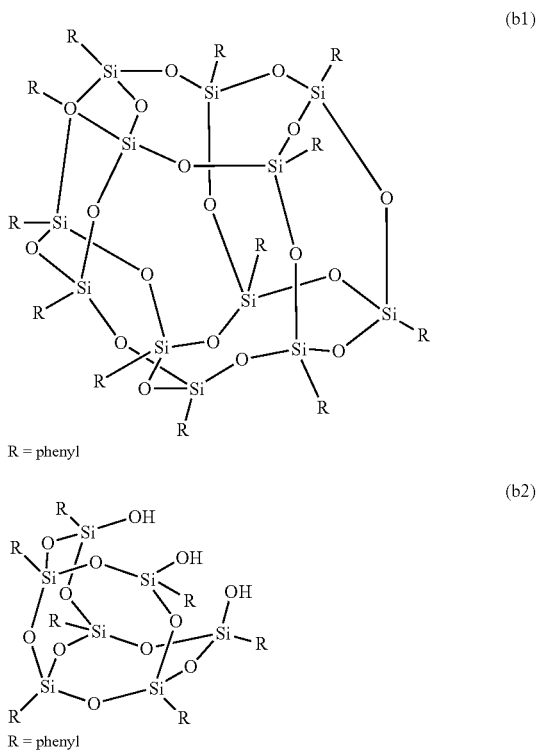

Using the unstretched films and stretched films produced in the above Examples and Comparative Examples and according to the above-mentioned methods, Tg, Tch, Tm and Tcc of the polyamide resin composition, the free volume of the polyamide resin composition, the carbon dioxide transmission rate and the oxygen transmission rate of the unstretched film, the oxygen transmission rate of the stretched film (secondary molded article) and the haze of the unstretched film were measured. The measured results are shown in Table 2.

TABLE 2

| | Polyamide (A1) | | Free Volume Modifier (B) or Additive | | DSC of Polyamide Resin Composition *2 (° C.) | | | | Free Volume of Polyamide Resin Composition (V) | V/Vo *3 |
|---|---|---|---|---|---|---|---|---|---|---|
| | type | amount added (part by mass) *1 | type | amount added (part by mass) *1 | Tg | Tch | Tm | Tcc | (nm³) | (—) |
| Example 1A | No. 1 | 100.000 | B-1 | 0.010 | 87 | 145 | 237 | 186 | 0.0543 | — |
| Example 2A | No. 1 | 100.000 | B-1 | 0.100 | 87 | 145 | 237 | 185 | 0.0543 | 0.9801 |
| Example 3A | No. 1 | 100.000 | B-1 | 0.500 | 87 | 145 | 237 | 187 | 0.0542 | — |
| Example 4A | No. 1 | 100.000 | B-1 | 2.000 | 87 | 145 | 237 | 187 | 0.0532 | — |
| Example 5A | No. 1 | 100.000 | B-2 | 0.010 | 87 | 145 | 237 | 185 | 0.0535 | — |
| Example 6A | No. 1 | 100.000 | B-2 | 0.100 | 87 | 145 | 237 | 185 | 0.0533 | 0.9621 |
| Example 7A | No. 1 | 100.000 | B-2 | 0.500 | 87 | 145 | 237 | 185 | 0.0533 | — |
| Example 8A | No. 2 | 100.000 | B-1 | 0.050 | 90 | 164 | 229 | 173 | 0.0531 | — |
| Example 9A | No. 3 | 100.000 | B-1 | 0.050 | 87 | 161 | 230 | 178 | 0.0532 | — |
| Comparative Example 1A | No. 1 | 100.000 | none | — | 87 | 145 | 237 | 185 | 0.0554 | — |
| Comparative Example 2A | No. 1 | 100.000 | B-1 | 0.003 | 87 | 145 | 237 | 186 | 0.0554 | — |
| Comparative Example 3A | No. 1 | 100.000 | talc | 0.100 | 87 | 134 | 237 | 195 | 0.0554 | 1.0000 |

TABLE 2-continued

| | | | | | | | | | | |
|---|---|---|---|---|---|---|---|---|---|---|
| Comparative Example 4A | No. 1 | 100.000 | sorbitol | 0.100 | 87 | 144 | 237 | 187 | 0.0552 | 0.9964 |
| Comparative Example 5A | No. 2 | 100.000 | none | — | 90 | 164 | 229 | 173 | 0.0554 | — |
| Comparative Example 6A | No. 3 | 100.000 | none | — | 87 | 161 | 230 | 178 | 0.0554 | — |

| | Carbon Dioxide Transmission Rate of Unstretched Film *4 (ml/atm · day · m$^2$) | Oxygen Transmission Rate of Unstretched Film *5 (ml/atm · day · m$^2$) | | Oxygen Transmission Rate of Stretched Film *5 (ml/atm · day · m$^2$) | Haze of Unstretched Film *8 (—) |
|---|---|---|---|---|---|
| | 23° C. 0% RH | 23° C. 60% RH | 23° C. 90% RH | 23° C. 60% RH | 23° C. 50% RH |
| Example 1A | 2.22 | 0.67 | 1.75 | 0.31 | 0.3 |
| Example 2A | 2.21 | 0.65 | 1.74 | 0.31 | 0.5 |
| Example 3A | 2.13 | 0.63 | 1.74 | 0.30 | 0.8 |
| Example 4A | 0.60 | 0.55 | 1.69 | 0.28 | 6.7 |
| Example 5A | 1.32 | 0.66 | 1.74 | 0.33 | 0.2 |
| Example 6A | 0.90 | 0.65 | 1.74 | 0.32 | 0.5 |
| Example 7A | 0.80 | 0.63 | 1.71 | 0.33 | 0.7 |
| Example 8A | 0.50 | 0.65 | 1.76 | 0.31 | 0.7 |
| Example 9A | 0.60 | 0.04 | 0.07 | 0.02 | 0.6 |
| Comparative Example 1A | 2.55 | 0.88 | 1.90 | 0.47 | 3.0 |
| Comparative Example 2A | 2.55 | 0.88 | 1.91 | 0.48 | 0.6 |
| Comparative Example 3A | immeasurable *7 | 0.67 | 1.85 | not stretchable | 1.2 |
| Comparative Example 4A | 2.53 | 0.55 | 2.45 | 0.29 | 0.4 |
| Comparative Example 5A | 2.58 | 0.78 | 1.92 | 0.56 | 2.1 |
| Comparative Example 6A | 2.57 | 0.12 | 0.17 | 0.47 | 1.9 |

*1 Solid Ratio
*2 10° C./min r.t.→260° C. →rapid cooling→10° C./min r.t. →260° C. 5 min hold → −5° C./min 260° C. →120° C.
*3 Ratio of the free volume value (V) of the resin composition containing 100 parts by mass of the polyamide and 0.010 parts by mass of the additive, to the free volume value (V$_0$, 0.0554 nm$^3$) of the polyamide alone of Comparative Example 1, (V/V$_0$).
*4 Value after 2 weeks in continuous measurement of CO$_2$TR.
*5 Value after 2 weeks in continuous measurement of OTR.
*6 Value of the unstretched film having a thickness of 50 μm after left for 1 week in an environment of 23° C. and 50% RH.
*7 A stretched film could not be produced, and the test was terminated without measurement.

From the results of Comparative Examples 1A, 5A and 6A in Table 2, the value of the free volumes (V$_0$) of the polyamide (A1) alone of the "polyamides Nos. 1 to 3" each was 0.0554 nm$^3$. In Examples 2A and 6A and Comparative Examples 3A and 4A, the value of the free volume (V) of the resin composition containing 0.100 parts by mass of each additive relative to 100 parts by mass of the polyamide (A), and the ratio of V/V$_0$ are as shown in Table 2. "B-1 (Dodecaphenyl POSS)" and "B-2 (Trisilanophenyl POSS)" used in the resin compositions of which the ratio V/V$_0$ is not more than 0.990 each correspond to the "free volume modifier (B)" in the present invention.

On the other hand, "talc" and "sorbitol" used in Comparative Examples 3A and 4A are additives not corresponding to the "free volume modifier (B)", from the above-mentioned value V/V$_0$.

As in Table 2, the polyamide resin compositions (1) of Examples 1A to 9A are controlled to have a free volume of not more than 0.0545 nm$^3$. Consequently, it is known that the unstretched films formed by molding the resin compositions (1) have a low carbon dioxide transmission rate and a low oxygen transmission rate and have excellent gas-barrier performance, as compared with the unstretched films produced in Comparative Examples 1A to 6A. In addition, the result shows that the stretched films of those Examples also have a low oxygen transmission rate.

In Comparative Example 3A, the exothermic peak temperature (crystallization temperature, Tch) in heating of the unstretched film lowered and the crystallization rate became high, and therefore, a stretched film could not be produced. With respect to the molded article formed from the resin composition in Comparative Example 4 in which sorbitol was added to the polyamide, the gas-barrier performance against oxygen greatly worsened in the high-humidity atmosphere (23° C., 90% RH).

The FIGURE is a graph showing the relationship between the free volumes of the polyamide resin compositions (1)

prepared in Examples and Comparative Examples and the carbon dioxide transmission rates of the unstretched films formed by molding the resin compositions (1). From the graph, it is known that, when the free volume of the polyamide resin composition (1) is not more than 0.0545 nm$^3$, the carbon dioxide transmission rate of the unstretched film of the composition lowers and the gas-barrier performance thereof against carbon dioxide is improved. In addition, it is also known that the effect of lowering the carbon dioxide transmission rate and improving the gas-barrier performance against carbon dioxide is more significantly exhibited when the free volume of the polyamide resin composition is 0.0535 nm$^3$ or less.

[Polyamide Resin Composition (2)]

The polyamide resin composition (2) is described further in detail with reference to the following Examples 1B to 12B, Comparative Examples 1B to 4B, and Reference Example 1B.

Examples 1B to 12B, Comparative Example 1B, and Reference Example 1B

An unstretched film was produced using a single-screw film production apparatus equipped with a full-flight twin-screw having a diameter of 25 mm, a feed block, a T-die, a chill roll, a winder and others.

First, the polysilsesquioxane (B) of the type and the amount shown in Table 3 was added to and dry-blended with 100 parts by mass of the polyamide of the type shown in Table 3, and the resulting blend was put into the above-mentioned apparatus, and extruded at 265° C. to give an unstretched film having a thickness of 100 μm and an unstretched film having a thickness of 50 μm.

Also in the same manner as in the above, an unstretched film having a thickness of 235 to 245 μm was produced, and the unstretched film was stretched at a stretching temperature of 130° C. by 4 times in MD and 4 times in TD, using a biaxial stretching apparatus (by a tenter method, manufactured by Toyo Seiki Seisaku-sho, Ltd.), and then thermally fixed at 210° C. for 30 seconds to give a secondary molded article, a stretched film having a thickness of 15 μm.

In Examples 1B to 12B, Comparative Example 1B and Reference Example 1B, any of the above-mentioned compounds B-1 and B-2 and the following Compound B-3 was used as the polysilsesquioxane (B).

"B-3": SR-23 (product name, manufactured by Konishi Chemical Industry Co., Ltd., compound represented by the following formula (b3), weight-average molecular weight: 500 to 1500).

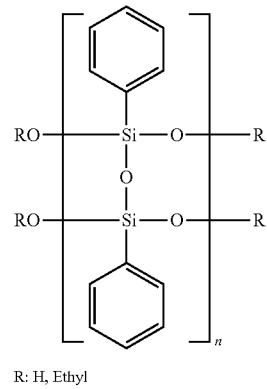

(b3)

R: H, Ethyl n indicates a positive integer.

Comparative Example 2B

In the same manner as in Example 1 except that the polysilsesquioxane (B) was not added, an unstretched film having a thickness of 100 μm, an unstretched film having a thickness of 50 μm, and a stretched film having a thickness of 15 μm, which is a secondary molded article, were produced.

Comparative Example 3B

In the same manner as in Example 1 except that 0.100 parts by mass of powdery talc (manufactured by Matsumura Sangyo Co., Ltd., product name "DG-5000") was added in place of the polysilsesquioxane (B), an unstretched film having a thickness of 100 μm, and an unstretched film having a thickness of 50 μm were produced. In addition, forming a stretched film which is a secondary molded article was tried, but the film could not be stretched and therefore the intended stretched film could not be produced.

Comparative Example 4B

In the same manner as in Example 1 except that 0.100 parts by mass of powdery bis(N-propylbenzylidene)sorbitol (manufactured by Milliken, product name "Millad NX8000") was added in place of the polysilsesquioxane (B), an unstretched film having a thickness of 100 μm, an unstretched film having a thickness of 50 μm and a stretched film having a thickness of 15 μm which is a secondary molded article were produced.

Using the unstretched films and stretched films produced in the above Examples, Comparative Examples and Reference Example and according to the above-mentioned methods, Tg, Tch, Tm and Tcc of the unstretched film (polyamide resin composition (2)), the oxygen transmission rate and the water vapor transmission rate of the unstretched film having a thickness of 100 μm, the haze of the unstretched film having a thickness of 50 μm, and the oxygen transmission rate of the stretched film having a thickness of 15 μm were measured. The results are shown in Table 3.

TABLE 3

| | Polyamide (A) | Polysilsesquioxane (B) | Amount Added of Polysilsesquioxane (B) (part by mass) *1 | Oxygen Transmission Rate of Unstretched Film of 100 μm thick *2 (ml/atm · day · m²) | |
|---|---|---|---|---|---|
| | | | | 23° C. 60% RH | 23° C. 90% RH |
| Example 1B | No. 1 | B-1 | 0.010 | 0.67 | 1.75 |
| Example 2B | No. 1 | B-1 | 0.100 | 0.65 | 1.74 |
| Example 3B | No. 1 | B-1 | 0.500 | 0.63 | 1.74 |
| Example 4B | No. 1 | B-1 | 1.000 | 0.59 | 1.72 |
| Example 5B | No. 1 | B-2 | 0.010 | 0.66 | 1.74 |
| Example 6B | No. 1 | B-2 | 0.100 | 0.65 | 1.74 |
| Example 7B | No. 1 | B-2 | 0.500 | 0.63 | 1.71 |
| Example 8B | No. 1 | B-2 | 1.000 | 0.62 | 1.70 |
| Example 9B | No. 2 | B-1 | 0.050 | 0.65 | 1.76 |
| Example 10B | No. 3 | B-1 | 0.050 | 0.04 | 0.07 |
| Example 11B | No. 2 | B-3 | 0.050 | 0.63 | 1.74 |
| Example 12B | No. 3 | B-3 | 0.050 | 0.04 | 0.07 |
| Comparative Example 1B | No. 1 | B-1 | 0.003 | 0.88 | 1.91 |
| Comparative Example 2B | No. 1 | none | — | 0.88 | 1.90 |
| Comparative Example 3B | No. 1 | talc | 0.100 | 0.67 | 1.85 |
| Comparative Example 4B | No. 1 | sorbitol | 0.100 | 0.55 | 2.45 |
| Reference Example 1B | No. 1 | B-1 | 2.000 | 0.55 | 1.69 |

| | Water Vapor Transmission Rate of Unstretched Film of 100 μm thick *3 (ml/day · m²) | Haze of Unstretched Film of 50 μm thick *4 (ml/day · m²) | DSC Measurement of Unstretched Film (Polyamide Resin Composition) *5 (° C.) | | | | Oxygen Transmission Rate of Stretched Film of 15 μm thick *2 (ml/atm · day · m²) |
|---|---|---|---|---|---|---|---|
| | 40° C. 90% RH | 23° C. 50% RH | Tg | Tch | Tm | Tcc | 23° C. 60% RH |
| Example 1B | 32 | 0.3 | 87 | 145 | 237 | 186 | 0.31 |
| Example 2B | 31 | 0.5 | 87 | 145 | 237 | 185 | 0.31 |
| Example 3B | 30 | 0.8 | 87 | 145 | 237 | 187 | 0.30 |
| Example 4B | 29 | 1.1 | 87 | 145 | 237 | 186 | 0.29 |
| Example 5B | 32 | 0.2 | 87 | 145 | 237 | 185 | 0.33 |
| Example 6B | 31 | 0.5 | 87 | 145 | 237 | 185 | 0.32 |
| Example 7B | 31 | 0.7 | 87 | 145 | 237 | 185 | 0.33 |
| Example 8B | 30 | 2.1 | 87 | 145 | 237 | 185 | 0.33 |
| Example 9B | 30 | 0.7 | 92 | 167 | 229 | 147 | 0.31 |
| Example 10B | 30 | 0.6 | 87 | 161 | 230 | 170 | 0.02 |
| Example 11B | 30 | 0.5 | 92 | 167 | 237 | 147 | 0.30 |
| Example 12B | 30 | 0.6 | 87 | 161 | 230 | 170 | 0.03 |
| Comparative Example 1B | 36 | 0.6 | 87 | 145 | 237 | 186 | 0.48 |
| Comparative Example 2B | 36 | 3.0 | 87 | 145 | 237 | 185 | 0.47 |
| Comparative Example 3B | 36 | 1.2 | 87 | 134 | 237 | 195 | not stretchable |
| Comparative Example 4B | 43 | 0.4 | 87 | 144 | 237 | 187 | 0.29 |
| Reference Example 1B | 27 | 6.7 | 87 | 145 | 237 | 187 | 0.28 |

*1 ratio by mass relative to 100 parts by mass of polyamide (A)
*2 Value after 2 weeks in continuous measurement of OTR.
*3 Value after 24 hours in continuous measurement and stabilization of WVTR.
*4 Haze after moisture control for 1 week at 23° C. and 50% RH
*5 10° C./min r.t.→260° C. →rapid cooling→10° C./min r.t. →260° C. 5 min hold → −5° C./min 260° C. →120° C.

The unstretched films produced in Examples 1B to 12B are excellent in the effect of preventing oxygen transmission and water vapor transmission and have a low haze, as compared with the film produced in Comparative Example 2B to which the polysilsesquioxane (B1) was not added. In addition, the secondary molded articles of the stretched films are also excellent in the effect of preventing oxygen transmission.

The film in Comparative Example 1B formed from the resin composition in which the amount of the component (B) was small could not exhibit the effect of the additive against oxygen transmission and water vapor transmission.

The film in Reference Example 1B formed from the resin composition in which the amount of the polysilsesquioxane (B1) was large caused deterioration in haze.

Further, in Comparative Example 3B in which talc was added to the resin composition in place of the component (B1), the exothermic peak temperature (crystallization temperature, Tch) in heating the unstretched film lowered, and the crystallization rate was accelerated, and therefore, a stretched film could not be formed.

In addition, the film in Comparative Film 4B formed by molding the resin composition to which a benzylidene sorbitol-type crystallization nucleating agent was added in place of the component (B1) has a high oxygen transmission rate and a high water vapor transmission rate in the environment at 23° C. and 90% RH (relative humidity). Consequently, the result is that the effect of the additive in the film for suppressing oxygen transmission and water vapor transmission at a high humidity is poor.

INDUSTRIAL APPLICABILITY

The polyamide resin composition (1) of the first aspect of the present invention can be a molding material for molded articles excellent in gas-barrier performance against carbon dioxide, oxygen and the like (especially excellent in gas-barrier performance against carbon dioxide).

Accordingly, the molded article formed by molding the polyamide resin composition (1) of the present invention is excellent in gas-barrier performance especially against carbon dioxide, and is therefore favorable as a food wrapping/packaging material such as PET bottles and the like for storing therein carbonated drink, beer, etc.

The polyamide resin composition (2) of the second aspect of the present invention has a high crystallization temperature and therefore can be a molding material for molded articles having good transparency and excellent in gas-barrier performance against oxygen, water vapor and the like (especially excellent in gas-barrier performance in high-humidity environments), not worsening the moldability thereof into stretched films, deep-drawn cups, etc.

Accordingly, the molded article formed by molding the polyamide resin composition (2) of the present invention is excellent in barrier performance against oxygen, water vapor and the like, especially excellent in gas-barrier performance in high-humidity environments, and is therefore favorable as a food wrapping/packaging material that is required to satisfy gas-barrier performance after thermal sterilization treatment such as boiling or retort treatment.

The invention claimed is:
1. A polyamide resin composition comprising a polyamide (A) and a free volume modifier (B), and having a free volume, as measured according to a positron annihilation method, of 0.0545 nm³ or less,
wherein the polyamide (A) is a polyamide (A1) that comprises a diamine unit comprising an aromatic diamine unit represented by the following general formula (I) in an amount of 70 mol % or more, and a dicarboxylic acid unit comprising at least one of a linear aliphatic dicarboxylic acid unit represented by the following general formula (II-1) and an aromatic dicarboxylic acid unit represented by the following general formula (II-2) in a total amount of 50 mol % or more:

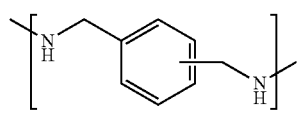
(I)

-continued

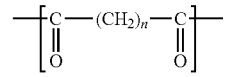
(II-1)

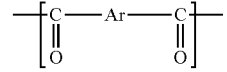
(II-2)

wherein n in the general formula (II-1) indicates an integer of from 2 to 18, and Ar in the general formula (II-2) represents an arylene group,
wherein the free volume modifier (B) is a polysilsesquioxane (B1) whose main chain is comprised of siloxane bonds and the content of the polysilsesquioxane (B1) is from 0.005 to 0.050 parts by mass relative to 100 parts by mass of the polyamide (A).

2. The polyamide resin composition according to claim 1, wherein the polysilsesquioxane (B1) is a compound represented by the following general formula (b):

$$(RSiO_{1.5})_n \qquad (b)$$

wherein n indicates an integer represented by (2m+4) (where m indicates an integer of 1 or more), R independently represents a hydrogen atom, a halogen atom, a hydroxyl group, an amino group, an imide group, an alkenyl group, an alkynyl group, a cyano group, a nitro group, an alkyl group having from 1 to 10 carbon atoms, a cycloalkyl group having from 3 to 12 carbon atoms, an aryl group having from 6 to 18 carbon atoms, an arylalkyl group having from 6 to 24 carbon atoms, a polyalkyleneoxy group having from 2 to 10 carbon atoms, an alkylcarbonyl group having an alkyl group with from 1 to 10 carbon atoms, an alkyl (meth)acrylate having an alkyl group with from 1 to 10 carbon atoms, an alkoxy group having from 1 to 10 carbon atoms, an aryloxy group having from 6 to 18 carbon atoms, or a siloxane.

3. The polyamide resin composition according to claim 1, wherein the polysilsesquioxane (B1) is a compound having a cage structure.

4. The polyamide resin composition according to claim 3, wherein the polysilsesquioxane (B1) is a polysilsesquioxane compound having a cage structure in which one or more bonds to form the cage structure are cleaved to provide a silicon atom and/or an oxygen atom which further have a substituent.

5. The polyamide resin composition according to claim 3, wherein the polysilsesquioxane (B1) is a polysilsesquioxane compound having a cage structure in which one or more of silicon atoms and oxygen atoms to form the cage structure are lost to provide a silicon atom and/or an oxygen atom which further have a substituent.

6. The polyamide resin composition according to claim 1, wherein the free volume, as measured according to a positron annihilation method, of the polyamide resin composition is 0.0535 nm³ or less.

7. A molded article formed by molding the polyamide resin composition of claim 1.

8. A secondary molded article formed by further stretching and/or thermoforming the molded article of claim 7.

9. The polyamide resin composition according to claim 1, wherein the polysilsesquioxane (B1) is a compound having a steric structure of a cage structure or a ladder structure.

10. The polyamide resin composition according to claim 1, further comprising any other resin than the polyamide (A).

* * * * *